United States Patent
Kamon

(10) Patent No.: US 9,554,960 B2
(45) Date of Patent: Jan. 31, 2017

(54) WEARABLE MOTION SUPPORTING DEVICE

(75) Inventor: Masayuki Kamon, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 670 days.

(21) Appl. No.: 13/989,262

(22) PCT Filed: Nov. 24, 2011

(86) PCT No.: PCT/JP2011/006546
§ 371 (c)(1),
(2), (4) Date: Aug. 9, 2013

(87) PCT Pub. No.: WO2012/070244
PCT Pub. Date: May 31, 2012

(65) Prior Publication Data
US 2013/0331744 A1 Dec. 12, 2013

(30) Foreign Application Priority Data

Nov. 24, 2010 (JP) .............................. 2010-261698
Feb. 25, 2011 (JP) .............................. 2011-040758
(Continued)

(51) Int. Cl.
*A61H 3/00* (2006.01)
*A61H 1/02* (2006.01)
*B25J 9/00* (2006.01)

(52) U.S. Cl.
CPC .............. *A61H 3/00* (2013.01); *A61H 1/0262* (2013.01); *A61H 1/0266* (2013.01); *B25J 9/0006* (2013.01);
(Continued)

(58) Field of Classification Search
CPC .......... A61H 3/00; A61H 1/00; A61H 1/0262; A61H 1/0266; A61H 2201/1215; A61H 2201/1623; A61H 2201/1628; A61H 2201/164; A61H 2201/5061; A61H 2201/5084; A61H 2230/00; A61B 5/1038; A61B 5/4528; A61B 5/6829; A61B 2562/0219; A61F 5/0102
See application file for complete search history.

(56) References Cited

U.S. PATENT DOCUMENTS 3,449,769 A 6/1969 Mizen
6,666,796 B1 * 12/2003 MacCready, Jr. ..... A61F 5/0102
135/65
(Continued)

FOREIGN PATENT DOCUMENTS

JP S59-42668 A 3/1984
JP H07-163607 A 6/1995
(Continued)

OTHER PUBLICATIONS

Mar. 17, 2015 Office Action issued in Japanese Application No. 2011-040758.
(Continued)

*Primary Examiner* — Quang D Thanh
(74) *Attorney, Agent, or Firm* — Oliff PLC

(57) ABSTRACT

A wearable motion supporting device includes a waist portion frame having a long base portion in a right-left direction of a wearer, a pair of right and left lower extremity frames connected to a lower portion of the waist portion frame, a back portion frame connected to an upper portion of the base portion of the waist portion frame, and a connection portion connecting the back portion frame and the base portion of the waist portion frame. The connection portion is made of a rotational mechanism of one DOF (Degree Of Freedom) on a frontal plane, for example, a four-node link mechanism.

15 Claims, 34 Drawing Sheets

(30) Foreign Application Priority Data

Feb. 25, 2011 (JP) ................................ 2011-040759
Sep. 13, 2011 (JP) ................................ 2011-199617
Sep. 22, 2011 (JP) ................................ 2011-207370

(52) U.S. Cl.
CPC . *A61H 2201/1215* (2013.01); *A61H 2201/164* (2013.01); *A61H 2201/165* (2013.01); *A61H 2201/1614* (2013.01); *A61H 2201/1623* (2013.01); *A61H 2201/1628* (2013.01); *A61H 2201/5061* (2013.01); *A61H 2201/5084* (2013.01); *A61H 2230/00* (2013.01)

(56) References Cited

U.S. PATENT DOCUMENTS

| | | | |
|---|---|---|---|
| 2005/0059908 A1* | 3/2005 | Bogert | A61F 5/0102 601/5 |
| 2006/0241539 A1* | 10/2006 | Agrawal | B25J 9/0006 602/23 |
| 2006/0260620 A1 | 11/2006 | Kazerooni et al. | |
| 2010/0121233 A1 | 5/2010 | Ashihara et al. | |

FOREIGN PATENT DOCUMENTS

| | | |
|---|---|---|
| JP | 2005-013534 A | 1/2005 |
| JP | A-2005-95561 | 4/2005 |
| JP | 2006-334200 A | 12/2006 |
| JP | A-2007-82798 | 4/2007 |
| JP | A-2007-307216 | 11/2007 |
| JP | 2008-220635 A | 9/2008 |
| JP | 2009-178369 A | 8/2009 |
| JP | A-2009-178253 | 8/2009 |
| JP | 2010-063581 A | 3/2010 |
| JP | A-2010-131372 | 6/2010 |
| JP | 2011-104035 A | 6/2011 |
| WO | WO 2010/100746 A1 | 9/2010 |

OTHER PUBLICATIONS

International Search Report issued in International Application No. PCT/JP2011/006546 on Feb. 21, 2012 (with translation).

\* cited by examiner

WEARABLE MOTION SUPPORTING DEVICE

TECHNICAL FIELD

The present invention relates to a device that is worn on a human body to assist or substitute for muscle strength of the human body.

BACKGROUND ART

In recent years, a wearable motion supporting device has been put to practical use, which is worn on a body of an elderly person or a physically handicapped person, and assists and substitutes for muscle strength to thereby support motions such as walking and riding (moving between a wheelchair and a bed, and the like). This technique has also been applied to development of a wearable motion supporting device that assists heavy work of a non-handicapped person. In order to drive the wearable motion supporting device for a long time, a battery having a long life is required. The above-described battery is generally large and heavy. Consequently, wearable motion supporting devices each having a structure that does not put a load of the device including the battery and a wearing fixture on a wearer have been described in Patent Documents 1, 2.

As shown in FIG. 14A, a wearable motion assisting device described in Patent Document 1 includes a wearing fixture 101 provided with an actuator, a biological signal sensor 102 that detects a biological signal of a wearer, and a control device 103 that operates the actuator, based on the biological signal of the wearer. The wearing fixture 101 includes a waist portion 104 wrapped around a trunk of the wearer, a backpack 105 inserted into the waist portion 104 from above, and leg portions 106 fixed to legs of the wearer. In the backpack 105, a battery and the control device 103 are housed. The leg portions 106 each include a hip joint actuator 111 fixed to a lower portion of the waist portion 104, a thigh orthosis 112, a knee joint actuator 113, a lower thigh orthosis 114 and a foot frame 115, which are connected to one another in this order. Since the wearing fixture 101 has the foot frames 115 to put feet of the wearer on, loads of the backpack and the wearing fixture are all supported by the foot frames without being applied to the wearer.

In Patent Document 2, a lower extremity exoskeleton device is described. The lower extremity exoskeleton device described in FIG. 9 in Patent Document 2 includes a pelvis frame 120, a back portion frame 121 connected to an upper portion of the pelvis frame 120, and lower extremity frames 123 connected to a lower portion of the pelvis frame 120, as shown in FIG. 15. In this lower extremity exoskeleton as well, a foot frame 124 to put a foot of the wearer on is provided in each of the lower extremity frames 123.

PRIOR ART DOCUMENTS

Patent Documents

Patent Document 1: Japanese Patent Laid-open Publication No. 2005-095561
Patent Document 2: US Patent No. 2006/0260620

SUMMARY OF THE INVENTION

Problems to be Solved by the Invention

When a human walks, it is known that a pelvis of the human swings at 5 to 8 degrees at a maximum from the horizontal on a frontal plane. Here, the "frontal plane" refers to a plane along which a body of the human is anteroposteriorly cut, and "swinging on the frontal plane" refers to swinging parallel to the frontal plane, centering on an axis perpendicular to the frontal plane. The frontal plane is also referred to as a coronal plane. In the wearable motion assisting device described in Patent Document 1, as shown in FIG. 14B, when the waist portion 104 swings from the horizontal with the swinging of the pelvis of the wearer, the swinging is propagated to the backpack 105 attached to the waist portion 104. Even if the shaking is small in the waist portion 104, the shaking becomes larger in an upper end portion of the backpack 105 at a distance from the waist portion 104. When the backpack 105 shakes, a portion of the backpack 105 tied on the body (a shoulder, a breast or a side) of the wearer is scraped against the body, which gives the wearer a discomfort feeling. Furthermore, since the backpack 105 is heavy, the wearer consumes excess muscle activities in order to make the walking stable in balance.

Moreover, as shown in FIG. 15, in the lower extremity exoskeleton device described in Patent Document 2, the pelvis frame 120 is divided into two right and left members, which are connected at one pivot, having two rotational DOFs (Degrees Of Freedom) on the frontal plane. The back portion frame 121 is pivotably supported by the pivot where the two members making up the pelvis frame 120 are pivotably connected. In the above-described structure, when the load carried on the back portion frame 121 becomes heavier, the back portion frame 121 tries to sink downward because of its own weight, and thus, a burden is imposed on a shoulder portion of the wearer through a shoulder belt tying the back portion frame 121 on the body of the wearer.

Consequently, an object of the present invention is to provide a wearable motion supporting device including a waist portion frame, a back portion frame connected to an upper portion of the waist portion frame, and lower extremity frames connected to a lower portion of the waist portion frame, wherein shaking of the back portion frame attributed to swinging of a pelvis of the wearer during walking of the wearer is suppressed, and a scrape of a locking fixture that ties the back portion frame on a body against the body is suppressed.

Solutions to the Problems

A wearable motion supporting device according to the present invention is a wearable motion supporting device that assists or substitutes for muscle strength of a wearer, including a waist portion frame that has a long base portion in a right-left direction of the wearer and is worn around a waist of the wearer, a pair of right and left lower extremity frames that is connected to a lower portion of the waist portion frame and is worn on lower extremities of the wearer, a back portion frame that is connected to an upper portion of the waist portion frame and has a locking fixture to tie the back portion frame on a shoulder of the wearer, and a rotational mechanism of one DOF (Degree Of Freedom) on a frontal plane that connects the back portion frame and the base portion of the waist portion frame. Here, the "rotational mechanism of one DOF on the frontal plane" refers to a mechanism that outputs a rotary motion of one DOF on the frontal plane to any one of the waist portion frame and the back portion frame with respect to an input motion of the other.

In the wearable motion supporting device, the rotational mechanism can be a four-node link mechanism made up of a lower link provided in the waist portion frame so as to be substantially parallel to the base portion, an upper link provided in the back portion frame, and a left link and a right link joined to the lower link and the upper link, respectively, the four-node link mechanism being line-symmetrical with a right-left center of the waist portion frame as a symmetrical axis.

According to the above-described wearable motion supporting device, while when the wearer wearing the device on his or her body walks, the waist portion frame swings from the horizontal with the swinging of the pelvis of the wearer, the swinging of this waist portion frame is not propagated to the back portion frame. Since in this manner, the lateral shaking of the back portion frame is suppressed, the scrape of the portion tying the back portion frame on the body of the wearer against the body can be prevented.

In the wearable motion supporting device, it is preferable that in the four-node link mechanism, a shape formed by lines connecting four nodes in order is an upside down trapezoid. In the four-node link mechanism, the four nodes correspond to joining portions of the respective links. Moreover, the "upside down trapezoid" refers to a trapezoid in which an upper side is longer than a lower side, and lengths of a left side and a right side are the same. According to the above-described configuration, in a one-leg standing state, a gravity center of the back portion frame moves to a loaded leg side with inclination of the waist portion frame, and a load of the device is applied to the lower extremity frame on the loaded leg side.

In the wearable motion supporting device, it is preferable that joining positions of the right link and the left link in at least one of the lower link and the upper link are variable in a right-left direction. According to the above-described configuration, a length of at least one of an upper side of the four-node link mechanism (between the joining portions of the right link and the left link to the upper link), and a lower side (between the joining portions of the right link and the left link to the lower link) is variable. By varying the length of at least one of the upper side and the lower side of the four-node link mechanism, a size of the four-node link mechanism can match a physical constitution of the wearer, and a maximum value of a displacement amount of a right-left center of the upper link with respect to the lower link when the lower link swings can be adjusted.

In the wearable motion supporting device, the rotational mechanism may be made up of a shaft perpendicular to the frontal plane, the shaft being inserted into joining holes provided at a substantial right-left center of the base portion of the waist portion frame and at a substantial right-left center of the back portion frame, respectively. According to the above-described configuration, the waist portion frame and the back portion frame make a pair having one rotational DOF on the frontal plane.

In the wearable motion supporting device, it is preferable that the pair of right and left lower extremity frames and the waist portion frame have a total of four rotational DOFs on the frontal plane, and a total of four or more rotational DOFs on a sagittal plane. In the above-described wearable motion supporting device, for example, the pair of right and left lower extremity frames each has a thigh arm that is worn on a thigh of the wearer, a lower thigh arm that is worn on a lower thigh of the wearer, and a foot arm that is worn on a foot portion of the wearer, the thigh arm and the lower thigh arm are connected turnably on the sagittal plane, and the waist portion frame and the thigh arm, and the lower thigh arm and the foot arm are connected turnably on the sagittal plane and on the frontal plane.

In the wearable motion supporting device, it is preferable that the lower extremity frames each have a restriction member that restricts a turning range of the lower thigh arm on the frontal plane with respect to the foot arm. According to the above-described configuration, in the one-leg standing state, even when the gravity center of the back portion frame moves to the loaded leg side or a lifted leg side, the lower thigh arm can be prevented from falling outward with respect to the foot arm.

In the wearable motion supporting device, it is preferable that the lower extremity frames each have a thigh arm that is worn on a thigh of the wearer, a lower thigh arm that is worn on a lower thigh of the wearer, and a first translational DOF mechanism that enables the thigh arm to extend in a translational direction from a reference length. Furthermore, in the wearable motion supporting device, the first translational DOF mechanism may have one rotational DOF in combination. According to the above-described configuration, the wearer can move his or her legs while being assisted by the wearable motion supporting device without uncomfortable feeling.

In the wearable motion supporting device, it is preferable that the lower extremity frames each have a thigh arm that is worn on a thigh of the wearer, a lower thigh arm that is worn on a lower thigh of the wearer, and a second translational DOF mechanism that enables the lower thigh arm to extend in a translational direction from a reference length. According to the above-described configuration, the wearer can move his or her legs while being assisted by the wearable motion supporting device without uncomfortable feeling.

In the wearable motion supporting device, it is preferable that the lower extremity frames each have a sole plate on which a foot of the wearer is placed. According to the above-described configuration, the load of the wearable motion supporting device can be supported by the sole plates without being applied to the wearer.

Effects of the Invention

According to the present invention, when the waist portion frame swings from the horizontal when the wearer is walking and the like, this swinging of the waist portion frame is not propagated to the back portion frame. Since in this manner, the lateral shaking of the back portion frame is suppressed, the scrape of the portion tying the back portion frame on the body of the wearer against the body can be prevented.

EMBODIMENTS OF THE INVENTION

Figure 1:
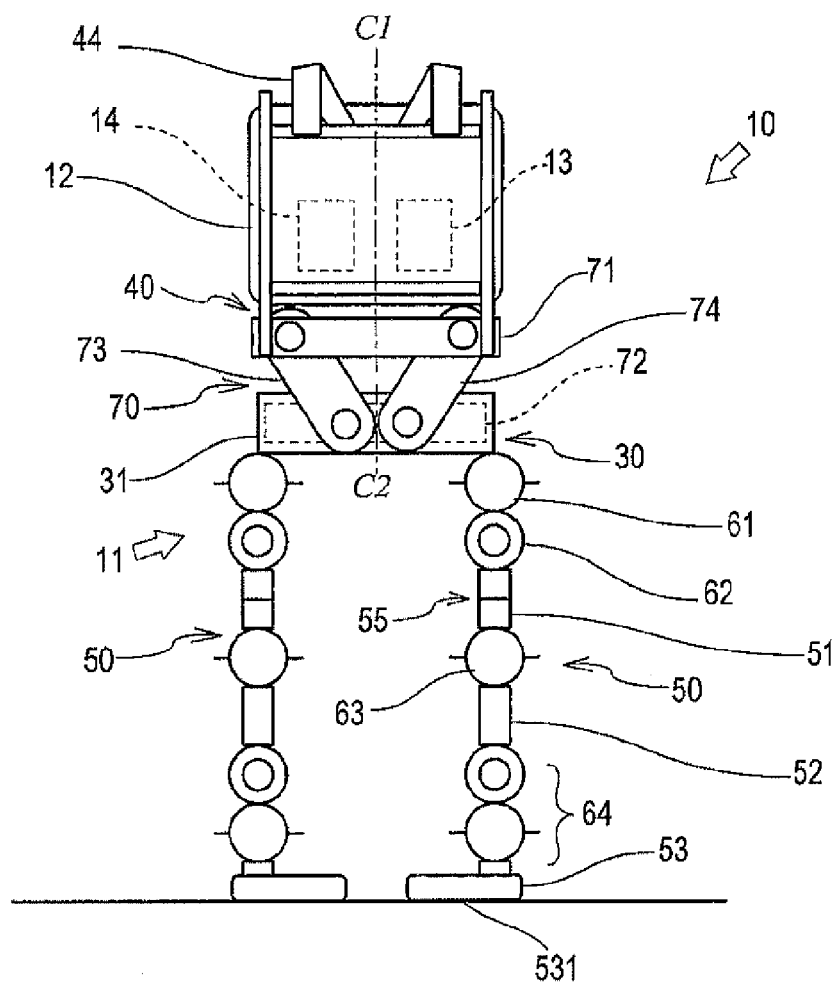
FIG. 1 is a schematic front view of a wearable motion supporting device according to an embodiment of the present invention.

Hereinafter, embodiments to carry out the present invention will be described in detail with reference to the drawings. Hereinafter, the same reference numerals are given to the same or corresponding elements in all the drawings, and redundant descriptions will be omitted.

A wearable motion supporting device 10 according to an embodiment of the present invention is worn on a human body, whether or not a wearer is an elderly person, or whether the wearer is a physically handicapped person or a non-handicapped person to assist or substitute for muscle strength of mainly lower extremity portions of the wearer, by which motions of the wearer are supported. As shown in FIG. 1, the wearable motion supporting device 10 includes a wearing fixture 11, and a battery 13 and a controller 14 housed in a backpack 12. The wearing fixture 11 is schematically made up of a waist portion frame 30 that is worn around a waist (pelvis) of the wearer, a back portion frame 40 that is worn on a back portion of the wearer, and right and left lower extremity frames 50, 50 that are worn on the lower extremity portions of the wearer. The backpack 12 is detachably carried on the back portion frame 40 of the wearing fixture 11. Subsequently, referring to FIGS. 1 to 3, a configuration of the wearing fixture 11 will be described in detail. Hereinafter, a "right-left direction" refers to a shoulder-width direction of the wearer, and an "anteroposterior direction" refers to an anteroposterior direction of the wearer, a "sagittal plane" refers to a plane that cuts a body of the wearer symmetrically in the right-left direction and a plane parallel to the same, and a "frontal plane" refers to a plane that anteroposteriorly cuts the body of the wearer, and is perpendicular to the sagittal plane.

[Waist Portion Frame 30]

The waist portion frame 30 is formed into a substantial U shape in plane view so as to be able to cover a rear side, and both right and left sides of the waist (pelvis) of the wearer.

Specifically, the waist portion frame 30 includes a base portion 31 which is long in the right-left direction and is located on a back side of the waist (pelvis) of the wearer, and side portions 32, 32 projected forward from both right and left ends of the base portion 31. The base portion 31 and the side portions 32, 32 are formed integrally, or formed separately to be fastened with fasteners such as bolts, nuts and the like, so that the waist portion frame 30 behaves integrally. The waist portion frame 30 according to the present embodiment is made up of the plurality of fastened members (the base portion 31 and the side portions 32, 32), and fastening positions thereof can be adjusted. By adjusting the fastening positions of the base portion 31 and the side portions 32 as needed, a usable dimension of the waist portion frame 30 can be adjusted so as to match a physical constitution of the wearer. The waist portion frame 30 includes locking fixtures (illustration is omitted) such as belts, hooks and the like to be tied around the waist of the wearer, so that the waist portion frame 30 is tied around the waist of the wearer.

[Lower Extremity Frame 50]

The right and left lower extremity frames 50, 50 have almost the same configuration, and are provided line-symmetrically in the right-left direction with a right-left center of the waist portion frame 30 as a symmetrical axis. Thus, only a structure of (left) one of the lower extremity frames 50 will be described in detail. The lower extremity frame 50 includes a thigh arm 51, a lower thigh arm 52, and a foot arm 53. The thigh arm 51 is tied to a thigh of the wearer, the lower thigh arm 52 is tied to a lower thigh of the wearer, and the foot arm 53 is tied to a lower portion from an ankle of the wearer. Each of the arms includes a locking fixture (illustration is omitted) such as a belt, a hook and the like to be tied to the body of the wearer.

Figure 4A:
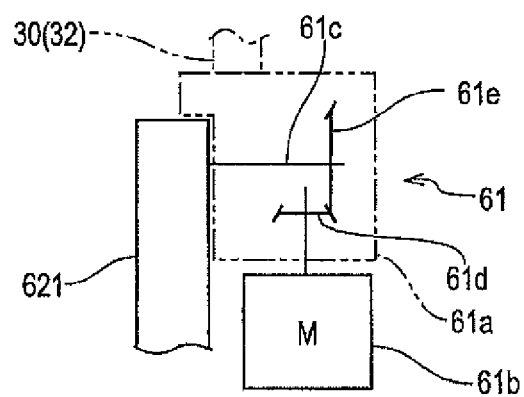
FIG. 4A is a configuration view of an actuator for hip joint.

The thigh arm 51 is connected to a front end portion of the side portion 32 of the waist portion frame 30 through an actuator for hip joint 61 and a joint for hip joint 62. The front end portion of the side portion 32 of the waist portion frame 30 is adjusted so as to be located lateral to an upper end of a femur of the wearer. The actuator for hip joint 61 is provided so as to be projected outward from the front end portion of the side portion 32 of the waist portion frame 30. As shown in FIG. 4A as well, the actuator for hip joint 61 includes a gear case 61a fixed to the waist portion frame 30, a first motor 61b, a first transmission shaft 61c supported substantially parallel to the frontal plane by a bearing provided inside the gear case 61a, and a first reduction gear 61e provided in the first transmission shaft 61c. The first reduction gear 61e is engaged with an output gear 61d of the motor 61b. The first transmission shaft 61c is fixed to a first coupling 62a, which is a component of the joint for hip joint 62. Moreover, the joint for hip joint 62 includes the first coupling 62a, a second coupling 62b connected to an upper portion of the thigh arm 51, and a pivot 62c connecting the first coupling 62a and the second coupling 62b turnably on the frontal plane. "Turning on the frontal plane" refers to turning around an axis perpendicular to the frontal plane in a state where parallelism to the frontal plane is maintained. According to the above-described configuration, output of the first motor 61b is transmitted to the first transmission shaft 61c through the output gear 61d and the first reduction gear 61e, so that the turning of the first transmission shaft 61c allows the first coupling 62a to turn on the sagittal plane with respect to the waist portion frame 30. "Turning on the sagittal plane" refers to turning around an axis perpendicular to the sagittal plane in a state where parallelism to the sagittal plane is maintained.

The thigh arm 51 is made up of a plurality of shaft-like members or long flat plate members, and these members are connected in a longitudinal direction. Joining positions of the respective members making up the thigh arm 51 are variable, and selecting these joining positions as needed allows a length (a dimension in the longitudinal direction) of the thigh arm 51 to be adjusted so as to match a length of the thigh of the wearer. The length of the thigh arm 51 adjusted in this manner is defined as a "reference length of the thigh arm". The reference length of the thigh arm is also a minimum length of the thigh arm 51.

Figure 5:
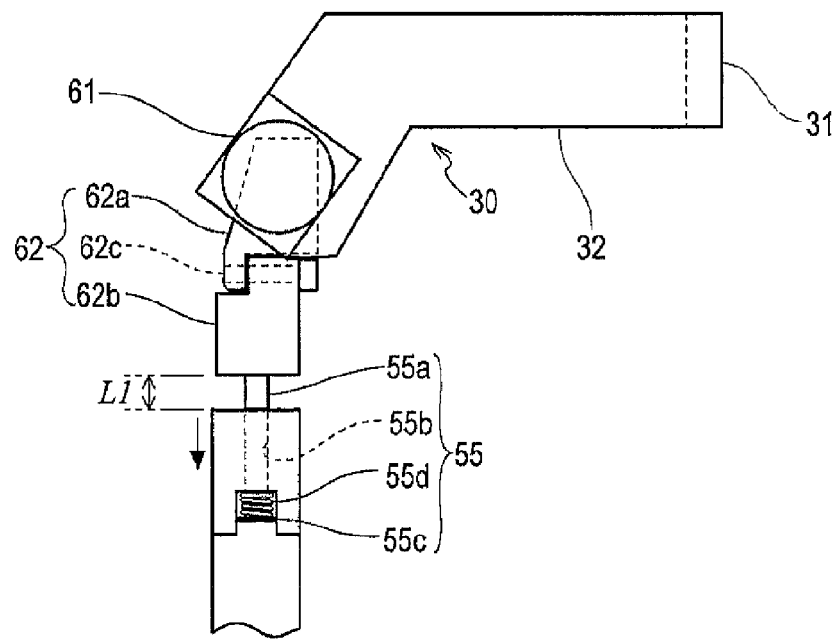
FIG. 5 is an enlarged side view of a first translational DOF mechanism.

The thigh arm 51 includes a first translational DOF (Degree Of Freedom) mechanism 55 that enables the thigh arm 51 to extend in a translational direction (longitudinal direction) by 1 to 30 mm from the reference length. FIG. 5 is a schematic view of the first translational DOF mechanism. As shown in FIG. 5, in a connection portion between the thigh arm 51 and the second coupling 62b of the joint for hip joint 62, a connection pin 55a extending in the translational direction is provided in one of the thigh arm 51 and the second coupling 62h, and a connection hole 55b into which the connection pin 55a is slidably inserted is provided in the other. These connection pin 55a and the connection hole 55b make up the first translational DOF mechanism 55. The connection pin 55a and the thigh arm 51 make a sliding pair, and sliding is produced between the connection pin 55a and the connection hole 55b to extend the thigh arm 51 in the translational direction. Furthermore, the connection pin 55a is turnable in a radial direction (around an axis of the connection pin 55a) inside the connection hole 55b, by which a convolution DOF (one rotational DOF around the axis) is provided to the thigh arm 51. In the present embodiment, the connection pin 55a is projected downward at a lower end of the second coupling 62b, and the connection hole 55b extending in the translational direction is provided at an upper end portion of the thigh arm 51. The connection pin 55a is longer than the connection hole 55b, and a lower end of the connection pin 55a penetrates the connection hole 55b downward. A flange portion 55c having a larger diameter than that of the connection hole 55b is provided at the lower end of the connection pin 55a to function as a stopper of the connection pin 55a from the connection hole 55b. An opening edge of the connection hole 55b and the flange portion 55c are spaced from each other in the translational direction, and a compression spring is externally fitted, as a biasing member 55d, on the connection pin 55a between the opening edge of the connection hole 55b and the flange portion 55c. In the above-described configuration, an extension margin L1 in the translational direction of the thigh arm 51 is a length of the connection pin 55a that appears between the lower end of the second coupling 62b and an upper end of the thigh arm 51. When the lower end of the second coupling 62b and the upper end of the thigh arm 51 are in contact, the extension margin L1 is 0, and the biasing member 55d is biasing the connection pin 55a so that the extension margin L1 is 0. When a tensile load is applied to the thigh arm 51, the connection pin 55a moves inside the connection hole 55b against a biasing force of the biasing member 55d, thereby increasing the extension margin L1. Dimensions of the components of the first translational DOF mechanism 55 are decided so that the extension margin L1 is permitted in a range of 1 to 30 mm.

Figure 4B:
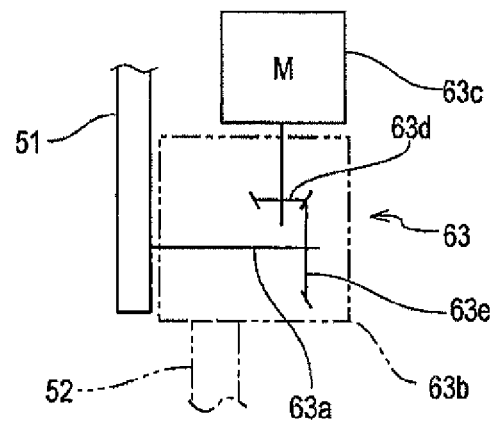
FIG. 4B is a configuration view of an actuator for knee joint.

The lower thigh arm 52 is connected to a lower portion of the thigh arm 51 through an actuator for knee joint 63. As shown in FIG. 4B, the actuator for knee joint 63 includes a gear case 63b fixed to an upper portion of the lower thigh arm 52, a second transmission shaft 63a supported substantially parallel to the frontal plane by a bearing provided inside the gear case 63h, and a second reduction gear 63e provided in the second transmission shaft 63a, a second motor 63c, and an output gear 63d provided in an output shaft of the second motor 63c. The output gear 63d and the second reduction gear 63e are engaged with each other. The second transmission shaft 63a is fixed to a lower end portion of the thigh arm 51. The above-described configuration allows the output of the second motor 63c to be transmitted to the second transmission shaft 63a through the output gear 63d and the second gear 63e, so that the lower thigh arm 52 is turned on the sagittal plane with respect to the thigh arm 51 by the turning of the second transmission shaft 63a.

The lower thigh arm 52 is made up of a plurality of shaft-like members or long flat plate members, which are fastened by fasteners such as bolts, nuts and the like. Fastening positions of these members are variable, and selecting these fastening positions as needed enables a length of the lower thigh arm 52 (a dimension in the longitudinal direction) to be adjusted so as to match a length of a lower thigh of the wearer. The length of the lower thigh arm 52 adjusted in this manner, is defined as a "reference length of the lower thigh arm". The reference length of the lower thigh arm is also a minimum length of the lower thigh arm 52.

Figure 6:
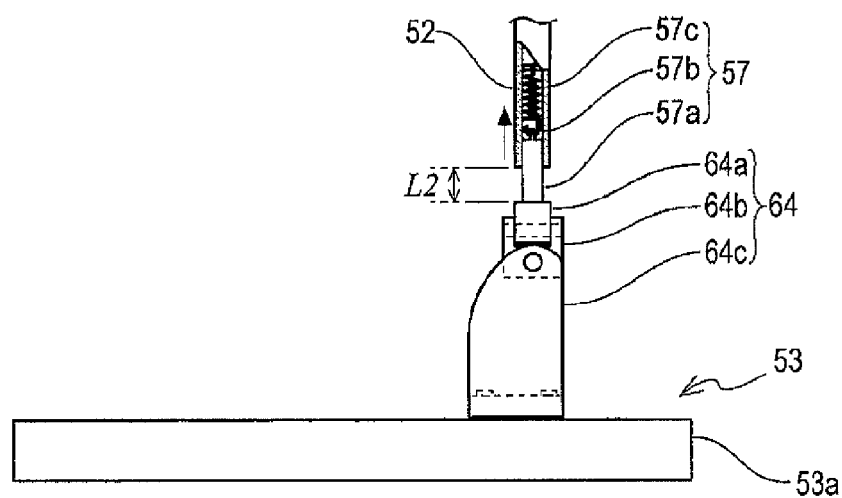
FIG. 6 is an enlarged side view of a second translational DOF mechanism.

The lower thigh arm 52 includes a second translational DOF mechanism 57 that enables the lower thigh arm 52 to extend in the translational direction (longitudinal direction) by 1 to 30 mm from the reference length. FIG. 6 is a schematic view of the second translational DOF mechanism. As shown in FIG. 6, in a connection portion between a lower end of the lower thigh arm 52 and a first coupling 64a of a joint for foot joint 64 described later, a rectangular column portion 57a extending in the translational direction is provided in one of the lower thigh arm 52 and the first coupling 64a, and a rectangular tube portion 57b into which the rectangular column portion 57a is inserted slidably is provided in the other. These rectangular column portion 57a and rectangular tube portion 57b make up the second translational DOF mechanism 57. The rectangular column portion 57a and the lower thigh arm 52 make a sliding pair, and the rectangular column portion 57a slides in the translational direction inside the rectangular tube portion 57b to extend the lower thigh arm 52 in the translational direction. In the present embodiment, the rectangular tube portion 57b is provided in a lower end portion of the lower thigh arm 52, and the rectangular column portion 57a is provided in an upper end portion of the first coupling 64a. Furthermore, the rectangular tube portion 57b includes a tension spring as a biasing member 57c that biases the rectangular column portion 57a in a direction where it is housed in the rectangular tube portion 57b. In the above-described configuration, an extension margin L2 in the translational direction of the lower thigh arm 52 is a length of the rectangular column portion 57a that appears between the lower end of the lower thigh arm 52 and an upper end of the first coupling 64a. When the lower end of the lower thigh arm 52 and the upper end of the first coupling 64a are in contact, the extension margin L2 is 0, and the biasing member 57c is biasing the rectangular column portion 57a so that the extension margin L2 is 0. When a tensile load is applied to the lower thigh arm 52, the rectangular column portion 57a moves inside the rectangular tube portion 57b against a biasing force of the biasing member 57c, thereby increasing the extension margin L2. Dimensions of the components of the second translational DOF mechanism 57 are decided so that the extension margin L2 is permitted in a range of 1 to 30 mm.

The lower thigh arm 52 and the foot arm 53 are connected through the joint for foot joint 64. The joint for foot joint 64 includes the first coupling 64a connected to the lower end of the lower thigh atm 52, a second coupling 64b connected to the first coupling 64a turnably on the frontal plane, and a third coupling 64c connected to the second coupling 64b turnably on the sagittal plane. To a lower portion of the third coupling 64c is connected a sole plate 53a making the foot arm 53. The sole plate 53a has an integral shape covering at least a heel of the wearer.

The pair of right and left lower extremity frames 50 and the waist portion frame 30 having the above-described configurations have a total of four rotational DOFs on the frontal plane, and a total of four or more (six in the present embodiment) rotational DOFs on the sagittal plane. The rotational DOFs on the frontal plane are provided in the connection portion between the waist portion frame 30 and the thigh arm 51, and the connection portion between the lower thigh arm 52 and the foot arm 53, respectively. Moreover, the rotational DOFs on the sagittal plane are provided in the connection portion between the waist portion frame 30 and the thigh arm 51, the connection portion between the thigh arm 51 and the lower thigh arm 52, and the connection portion between the lower thigh arm 52 and the foot arm 53, respectively. By setting the DOFs of motions for the waist portion frame 30 and the pair of right and left lower extremity frames 50, 50, as described above, the wearing fixture 11 can provide motions of the lower extremities with less uncomfortable feeling to the wearer.

[Back Portion Frame 40]

The back portion frame 40 is a so-called frame for backpack. The back portion frame 40 includes a locking fixture 44 such as side belts, shoulder straps, hooks and the like to be tied on the shoulder or the breast of the wearer. The backpack 12 is carried on the back portion frame 40. The battery 13 housed in the backpack 12 supplies electricity to the actuator for hip joint 61, the actuator for knee joint 63, and the controller 14. Moreover, the controller 14 housed in the backpack 12 receives detection signals from sensors (illustration is omitted) provided in the respective portions of the wearing fixture 11 to control the actuator for hip joint 61 and the actuator for knee joint 63 so that the wearing fixture 11 assists or substitutes for the motions of the wearer. While the above-described sensors are sensors that detect physical amounts such as amounts of change of gravity centers of the members, amounts of load applied to the members, in place of these, or in addition to these, a biological signal sensor that detects a biological signal of the wearer may be employed. The use of the biological signal sensor can produce power following the wearer's will in the actuators 61, 63.

Figure 7:
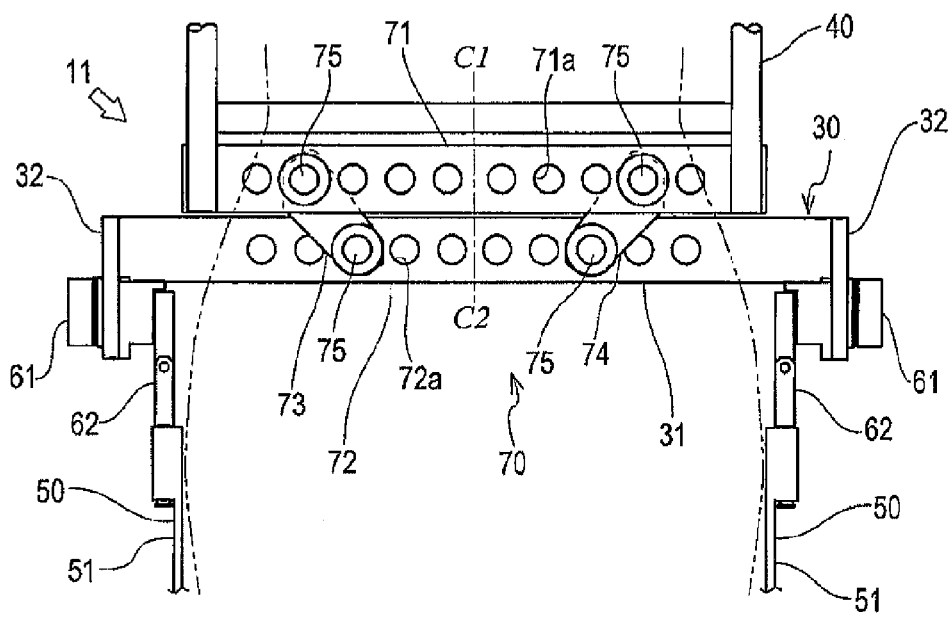
FIG. 7 is a front view showing a connection portion between a waist portion frame and a back portion frame.

A connection portion 70 connecting the back portion frame 40 and the waist portion frame 30 is made of a rotational mechanism of one DOF on the frontal plane. Here, the "rotational mechanism of the one DOF on the frontal plane" refers to a mechanism that outputs a rotary motion of the one DOF on the frontal plane to one of the waist portion frame 30 and the back portion frame 40 with respect to input of the other. FIG. 7 is a front view showing the connection portion between the waist portion frame and the back portion frame. As shown in FIG. 7, an upper link 71 is provided in a lower portion of the back portion frame 40. The upper link 71 is a member extending in a substantially horizontal direction, and a right-left center C1 of the upper link 71 matches a right-left center of the back portion frame 40. In the upper link 71, a plurality of joining holes 71a are provided symmetrically in the right-left direction with the right-left center C1 of the upper link 71 as a symmetrical axis. On the other hand, a lower link 72 is provided in the base portion 31 of the waist portion frame 30. In the waist portion frame 30 according to the present embodiment, a part of the base portion 31 functions as the lower link 72. The base portion 31 of the waist portion frame 30 may function as the lower link 72 as well, or the lower link 72 may be provided separately from the base portion 31. The lower link 72 is substantially parallel to the base portion 31, and a right-left center C2 of the lower link 72 matches a right-left center of the waist portion frame 30. In the lower link 72, a plurality of joining holes 72a are provided symmetrically in the right-left direction with the right-left center C2 of the lower link 72 as a symmetrical axis. One of the joining holes 71a of the upper link 71 and an upper portion of a right link 73 are joined turnably by a joining pin 75, and one of the joining holes 72a of the lower link 72 and a lower portion of the right link 73 are joined turnably by a joining pin 75. Similarly, one of the joining holes 71a of the upper link 71 and an upper portion of a left link 74 are joined turnably by a joining pin 75, and one of the joining holes 72a of the lower link 72 and a lower portion of the left link 74 are joined turnably by a joining pin 75. Joining positions of the right link 73 and the left link 74 to the upper link 71 are right-left symmetrical with the right-left center C1 of the upper link 71 as a symmetrical axis. Similarly, joining positions of the right link 73 and the left link 74 to the lower link 72 are right-left symmetrical with the right-left center C2 of the lower link 72 as a symmetrical axis. The upper link 71, the lower link 72, the right link 73 and the left link 74 having the above-described configuration form a planar four-node link mechanism, which is line-symmetrical in the right-left direction with the right-left center C2 of the lower link 72 as a symmetrical axis.

Figure 8A:
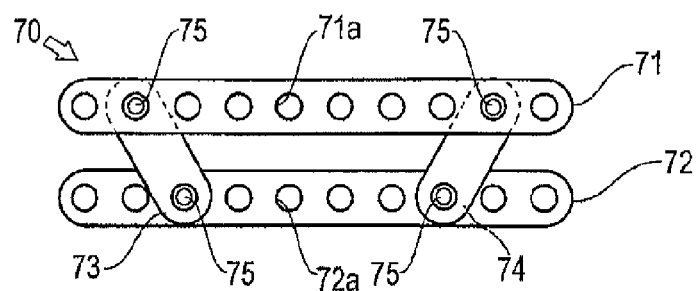
FIG. 8A is a view for describing a variation of a right-left symmetrical four-node link mechanism.
Figure 8B:
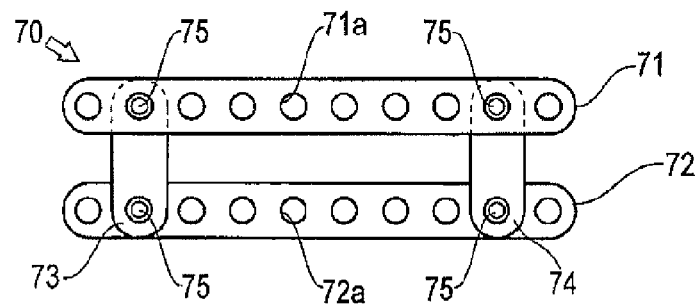
FIG. 8B is a view for describing a variation of the right-left symmetrical four-node link mechanism.
Figure 8C:
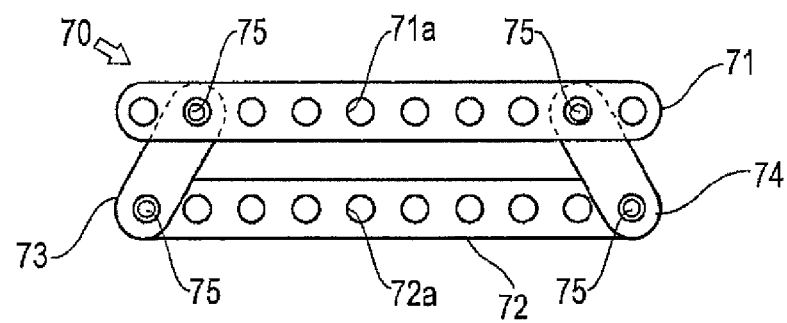
FIG. 8C is a view for describing a variation of the right-left symmetrical four-node link mechanism.

FIGS. 8A to 8C are views for describing variations of the right-left symmetrical four-node link mechanism. As the above-described right-left symmetrical planar four-node link mechanism, there are one in which a shape formed by lines connecting four nodes (the joining pins 75, 75, 75, 75) in order forms an upside down isosceles trapezoid (hereinafter, referred to as an "upside down trapezoid") having an upper side longer than a lower side as shown in FIG. 8A, one in which the lines form an isosceles trapezoid having the same upper side as the lower side in length as shown in FIG. 8B, and one in which the lines form an isosceles trapezoid having the upper side shorter than the lower side as shown in FIG. 8C. While any one of the above-described three types of right-left symmetrical four-node link mechanisms may be employed, the four-node link mechanism in which the four nodes form the upside down trapezoid is desirably employed. In the four-node link mechanism in which the four nodes form the upside down trapezoid, the right and left links 73, 74 form a "V" shape an apex of which is apart.

Figure 9:
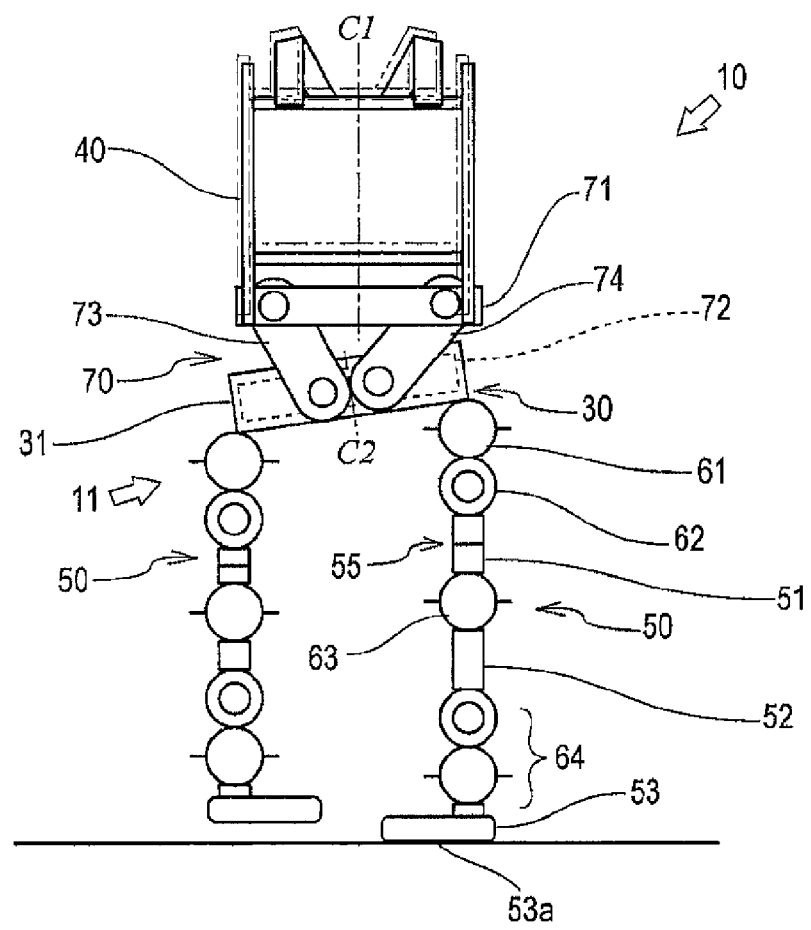
FIG. 9 is a schematic front view of the wearable motion supporting device in a one-leg standing state.

Subsequently, a state of the wearing fixture 11 when the wearer wearing, on his or her body, the wearable motion supporting device 10 having the above-described configuration walks will be described. FIG. 1 shows a both-leg standing state of the wearable motion supporting device 10, and FIG. 9 shows a one-leg standing state of the wearable motion supporting device 10. The both-leg standing state refers to a state where the wearer stands erect, and both the sole plates 53a are grounded, while the one-leg standing state refers to a state where one leg of the wearer moves away from the ground, so that one of the sole plates 53a is grounded and the other sole plate is in the air. As shown in FIG. 1, in the both-leg standing state, the wearing fixture 11 is in a right-left line-symmetrical state with the right-left center C2 of the waist portion frame 30 as a symmetrical axis. Accordingly, the lower link 72 provided in the waist portion frame 30 (i.e., the base portion 31) and the upper link 71 provided in the back portion frame 40 are substantially horizontal. In the both-leg standing state, loads of the wearing fixture 11 and the backpack 12 carried on the back portion frame 40 are supported by the sole plates 53a, 53a, so that these loads are not imposed on the wearer.

When from the both-leg standing state, the thigh arm 51 rotates forward on the sagittal plane with respect to the waist portion frame 30 by actuation of the actuator for hip joint 61 in one of the lower extremity frames 50, and the lower thigh arm 52 rotates rearward on the sagittal plane with respect to the thigh arm 51 by actuation of the actuator for knee joint 63, the sole plate 53a of the one lower extremity frame 50 moves away from the ground, thereby entering a state where the knee joint is lifted forward (the one-leg standing state) as shown in FIG. 9. When shifting from the both-leg standing state to the one-leg standing state, the one lower extremity frame 50 shifts from a loaded leg (grounded leg) to a lifted leg (ungrounded leg). When the lower extremity frame 50 shifts from the loaded leg to the lifted leg, the thigh arm 51 is extended by the first translational DOF mechanism 55 from the reference length in the translational direction, which allows the wearer to move his or her leg without uncomfortable feeling. Moreover, when the lower extremity frame 50 shifts from the lifted leg to the loaded leg, or ascends/descends, and so on, the lower thigh arm 52 is extended by the second translational DOF mechanism 57 from the reference length in the translational direction, following the motion of the lower extremity of the wearer, which allows the wearer to move the leg without uncomfortable feeling.

The pelvis of the wearer swings on the frontal plane during walking of the wearer, which causes the waist portion frame 30 to swing on the frontal plane as well. In the one-leg standing state, the pelvis of the wearer is inclined from the horizontal, and as a result, the lower link 72 (i.e., the base portion 31) provided in the waist portion frame 30 is inclined so that the loaded leg side is higher and the lifted leg side is lower. When the lower link 72 is inclined, in the connection portion 70, inclinations of the right link 73 and the left link 74 are changed to thereby maintain substantial horizontality of the upper link 71. In this manner, since the back portion frame 40 and the waist portion frame 30 are connected by the rotational mechanism of the one DOF on the frontal plane, even if the waist portion frame 30 swings on the frontal plane during walking of the wearer, this swinging is not propagated to the back portion frame 40. That is, lateral shaking of the back portion frame 40 is suppressed, which can prevent the scrape of the locking fixture 44 tying the back portion frame 40 on the wearer against the body of the wearer.

In the case where the shape formed by the lines connecting the four nodes of the four-node link mechanism making up the connection portion 70 in order is the upside down trapezoid, when the lower link 72 is inclined in the one-leg standing state, the right-left center C1 of the upper link 71 moves from the right-left center C2 of the lower link 72 to the loaded leg side. Since a gravity center of the back portion frame 40 is located on an extended line of the right-left center C1 of the upper link 71, moving of the right-left center C1 of the upper link 71 to the loaded leg side is synonymous with moving of the gravity center of the back portion frame 40 to the loaded leg side. In this manner, moving the gravity center of the back portion frame 40 to the loaded leg side in the one-leg standing state allows a weight of the pack portion frame 40 and the backpack 12 carried on the same to be supported by the lower extremity frame 50 on the loaded leg side, and thus, the weight is not imposed on the wearer. For the above-described reason, it is desirable that in the four-node link mechanism making up the connection portion 70, the shape formed by the lines connecting the four nodes in order is the upside down trapezoid.

Figure 2:
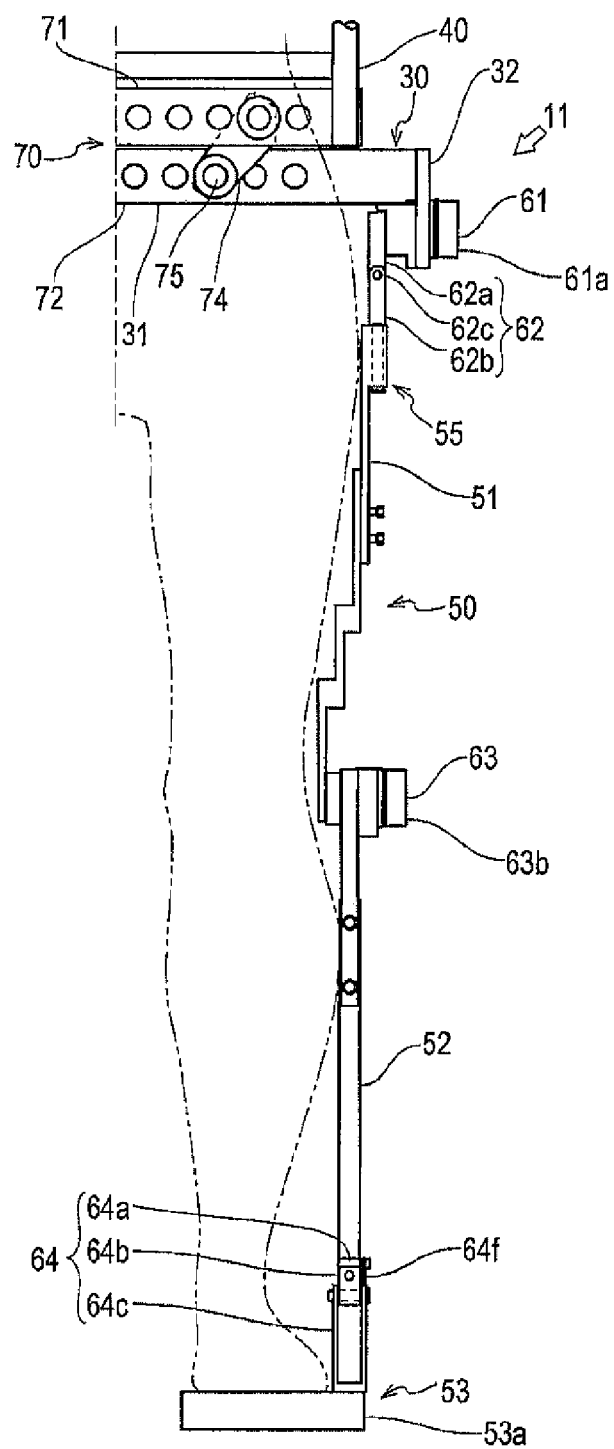
FIG. 2 is a front view showing a left lower portion of the wearable motion supporting device.
Figure 3:
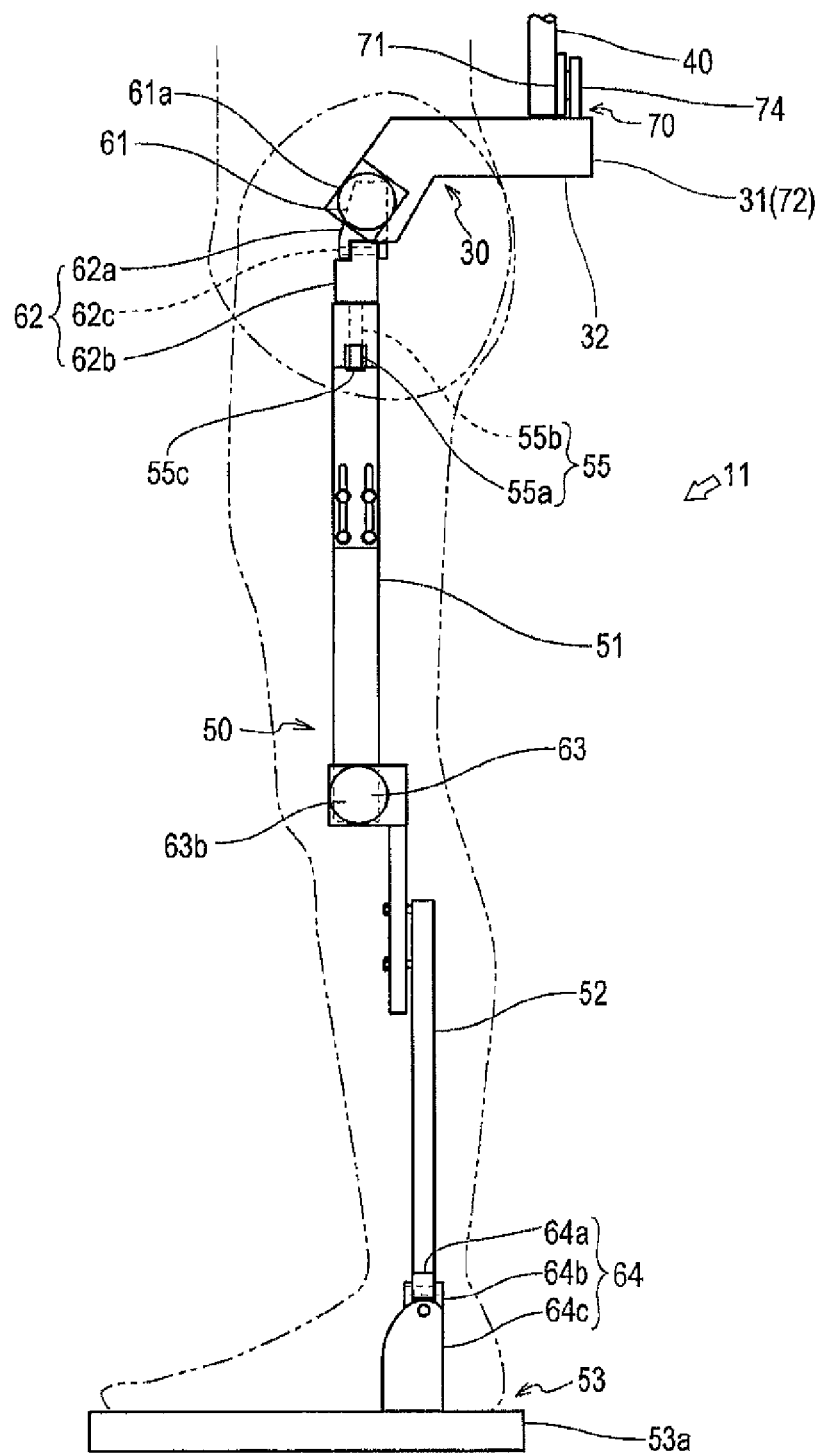
FIG. 3 is a side view showing the left lower portion of the wearable motion supporting device.

In the one-leg standing state as described above, when the gravity center of the back portion frame 40 moves to the loaded leg side, the lower extremity frame 50 on the loaded leg side is put into a state slightly deflected outward. Consequently, in order to prevent the lower extremity frame 50 from falling outward even if the lower extremity frame 50 is put into the state deflected outward, as shown in FIG. 2, in the joint for foot joint 64, a stopper 64f (restriction member) that restricts an outward turning range on the frontal plane of the first coupling 64a with respect to the second coupling 64b is provided. The outward turning range on the frontal plane of the first coupling 64a with respect to the second coupling 64b in the joint for foot joint 64 is restricted, which can prevent the lower thigh arm 52 from falling outward with respect to the sole plate 53a.

Moreover, in the one-leg standing state, as described before, the right-left center C1 of the upper link 71 is displaced in the horizontal direction from the right-left center C2 of the lower link 72. A displacement amount in the horizontal direction between the right-left center C1 of the upper link 71 and the right-left center C2 of the lower link 72 is defined as a "right-left center displacement amount $\Delta C$". When the right-left center displacement amount $\Delta C$ is within an appropriate range, the horizontality of the upper link 71 is maintained even if the waist portion frame 30 is inclined from the horizontal, as described above, and the loads of the wearing fixture 11 and the backpack 12 are not imposed on the wearer. However, if the right-left center displacement amount $\Delta C$ is excessive, that is, a discrepancy amount of the gravity center of the back portion frame 40 from the right-left center C2 of the lower link 72 is excessive, the gravity center of the back portion frame 40 moves to the loaded leg side excessively, thereby causing imbalance, so that in the wearer, extra muscular activities are required in order to keep balance. Consequently, in the connection portion 70 between the waist portion frame 30 and the back portion frame 40, the right-left center displacement amount $\Delta C$ is adjusted within the appropriate range. Specifically, it is known that the pelvis of a human during walking swings at 5 to 8 degrees at a maximum from the horizontal on the frontal plane. The connection portion 70 is adjusted so that when the waist portion frame 30 is inclined at the maximum swinging angle (here, 5 degrees) of the pelvis from the horizontal, a maximum value of the right-left center displacement amount $\Delta C$ becomes an upper limit value of the appropriate range or lower. For reference, according to "Human Walking, original, third edition" (Jessica Rose, James G, Gamble ed., Ishiyaku Pub. Inc.), in walking of a general adult male, a motion of a center of mass drawn on the frontal plane forms a slightly-distorted laterally-facing 8 shape, and the displacement of the pelvis drawn on the frontal plane also forms a slightly-distorted laterally-facing 8 shape. In one example described in this document, the displacement in the right-left direction of the center of mass when the pelvis is inclined at about 5 degrees from the horizontal is about 25 mm. According to this example, the appropriate range of the right-left center displacement amount $\Delta C$ is 0 to 25 mm to right and left, and if the right-left center displacement amount $\Delta C$ exceeds this appropriate range, the displacement in the right-left direction of the back portion frame 40 with respect to the waist portion frame 30 becomes largely discrepant from the motion of the body, which will impose a load on the wearer. Since the displacement in the right-left direction of the center of mass with respect to a swinging angle of the pelvis differs, depending on a length of stride, a walking speed, a physical constitution of a walker and the like, the appropriate range of the right-left center displacement amount $\Delta C$ also differs, depending on the length of stride, the walking speed, the physical constitution of the walker and the like.

Figure 10A:
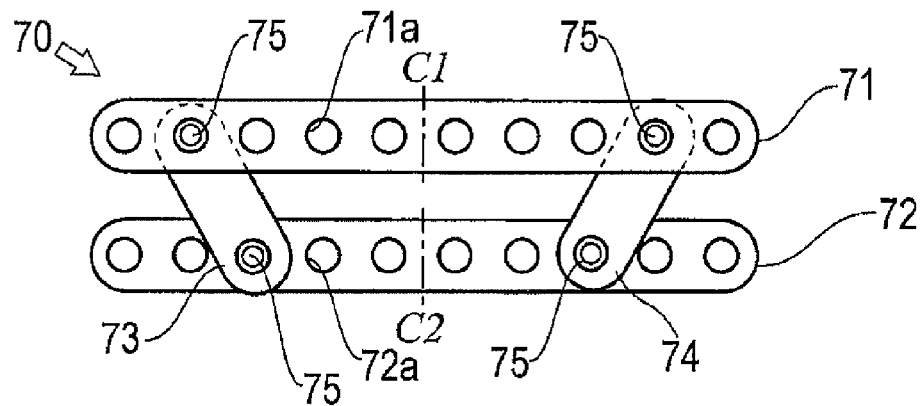
FIG. 10A is a view showing one example of the four-node link mechanism, showing a both-leg standing state.
Figure 10B:
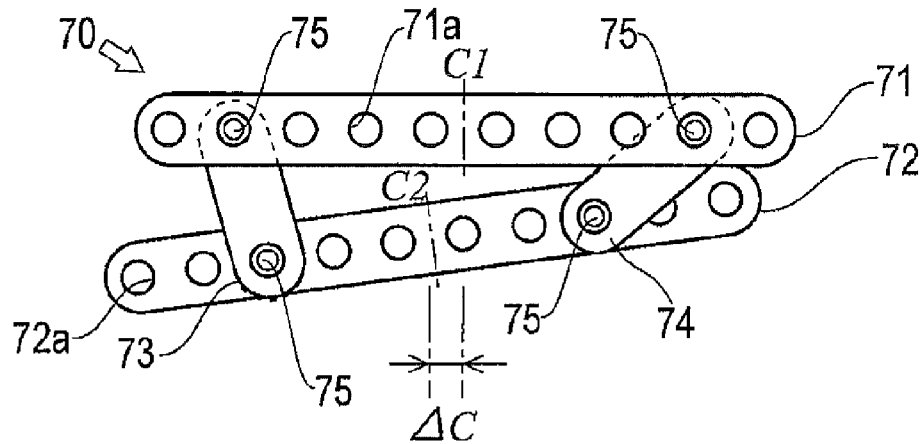
FIG. 10B is a view showing the one example of the four-node link mechanism, showing the one-leg standing state.
Figure 11A:
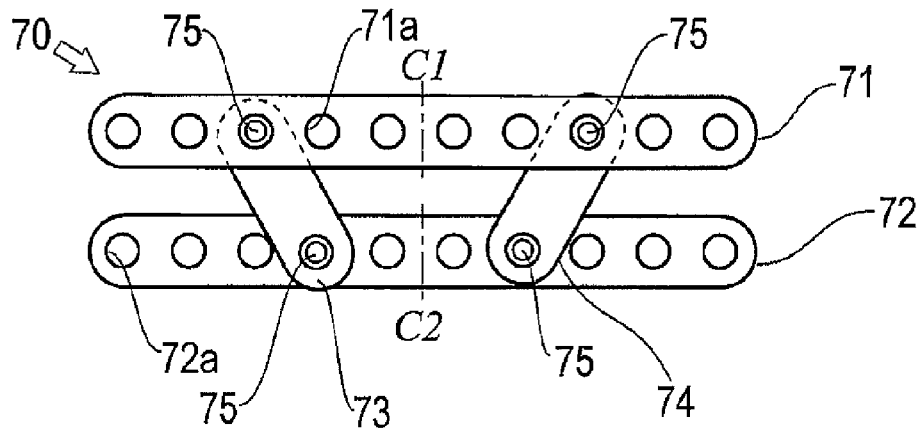
FIG. 11A is a view showing a modification of the four-node link mechanism, showing the both-leg standing state.
Figure 11B:
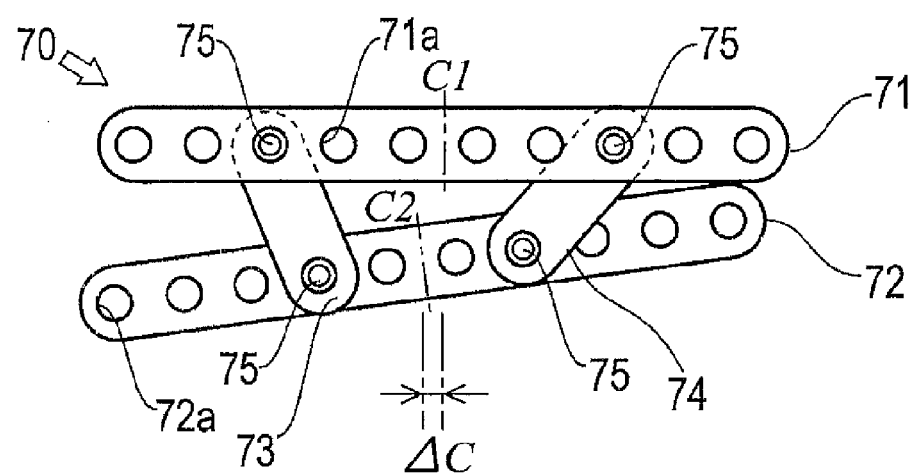
FIG. 11B is a view showing the modification of the four-node link mechanism, showing the one-leg standing state.

The maximum value of the right-left center displacement amount $\Delta C$ is decided in accordance with the shape of the four-node link mechanism making up the connection portion 70. FIGS. 10A and 10B show one example of the four-node link mechanism, and FIGS. 11A and 11B show a modification of the four-node link mechanism. While the four-node link mechanisms shown in FIGS. 10A and 11A have the right links 73 and the left links 74 each having the same length, they are different in a length of the upper side (between the joining pins 75, 75 of the upper link 71) and a length of the lower side (between the joining pins 75, 75 of the lower link 72), and both the upper link and the lower link in the four-node link mechanism shown in FIG. 10A are longer. FIGS. 10B and 11B show states where the respective lower links 72 of the four-node link mechanisms shown in FIGS. 10A and 11A are inclined at the same angle (here, 8 degrees) from the horizontal. As is clear from comparison between FIGS. 10B and 11B, the four-node link mechanism in which the lengths of the upper side and the lower side are longer (FIGS. 10A and 10B) has the larger right-left center displacement amount $\Delta C$. In this manner, in the four-node link mechanism, the maximum value of the right-left center displacement amount $\Delta C$ differs, depending on the lengths of the upper side and the lower side. In the connection portion 70 according to the present embodiment, since the upper link 71 and the lower link 72 each have the plurality of joining holes 71a, 72a, the lengths of the upper side (between the joining pins 75, 75 of the upper link 71) and the lower side (between joining pins 75, 75 of the lower link 72) of the four-node link mechanism are variable. Selecting an optimum combination from the plurality of joining holes 71a of the upper link 71 and the plurality of joining holes 72a of the lower link 72 allows the right-left center displacement amount $\Delta C$ to be kept within the upper limit value of the appropriate range. While in the connection portion 70 according to the present embodiment, the plurality of joining holes 71a, 72a are provided in the upper link 71 and the lower link 72, respectively, the joining positions of the right link 73 and the left link 74 only need to be variable in the right-left direction in at least any one of the upper link 71, and the lower link 72. This configuration makes variable the length of at least one of the upper side (between the joining pins 75, 75 of the upper link 71) and the lower side (between the joining pins 75, 75 of the lower link 72) of the four-node link mechanism. By varying the length of at least one of the upper side and the lower side of the four-node link mechanism, a size of the four-node link mechanism can match the physical constitution of the wearer, or the maximum value of the right-left center displacement amount $\Delta C$ when the lower link swings can be adjusted.

While in the foregoing, the one preferred embodiment of the present invention has been described, the present invention is not limited to the foregoing embodiment, but various modifications in design can be made within the scope of claims.

Figure 12A:
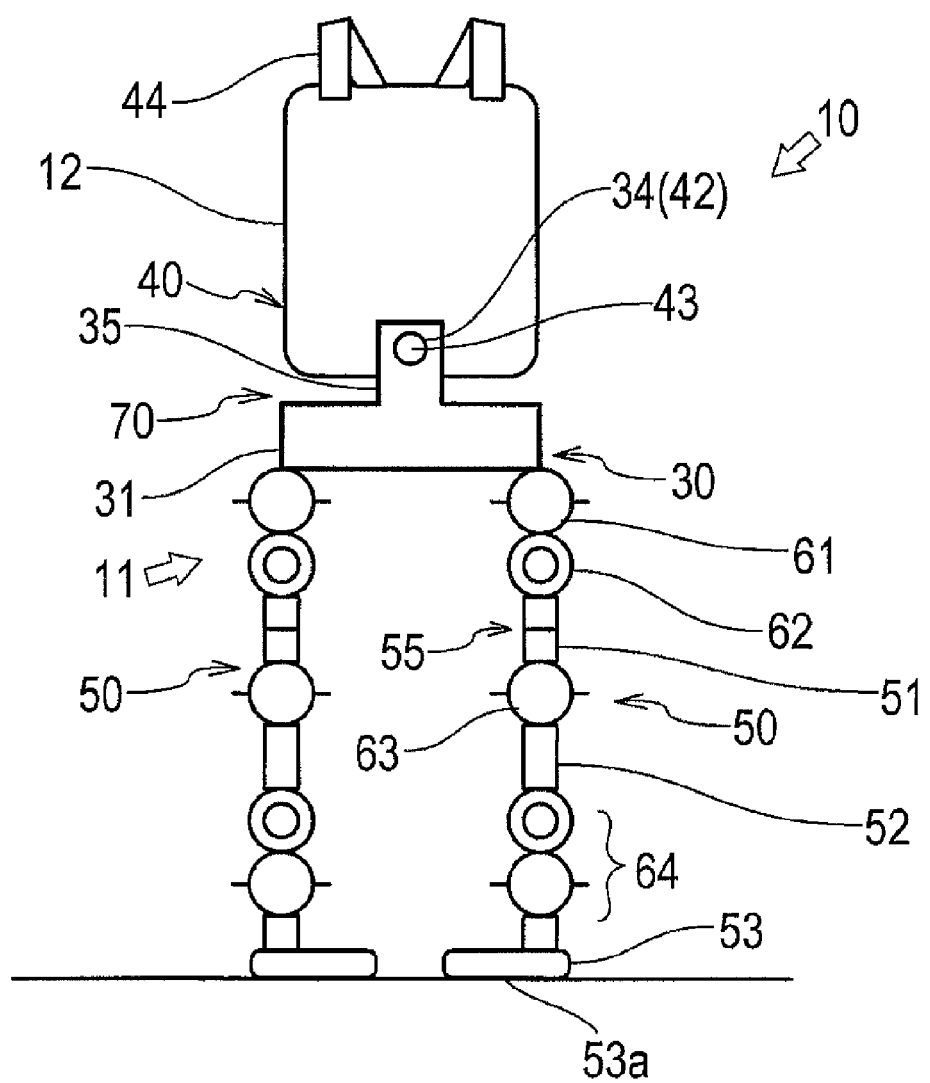
FIG. 12A is a schematic front view of a wearable motion supporting device showing a modification of the connection portion between the waist portion frame and the back portion frame, showing the both-leg standing state.
Figure 12B:
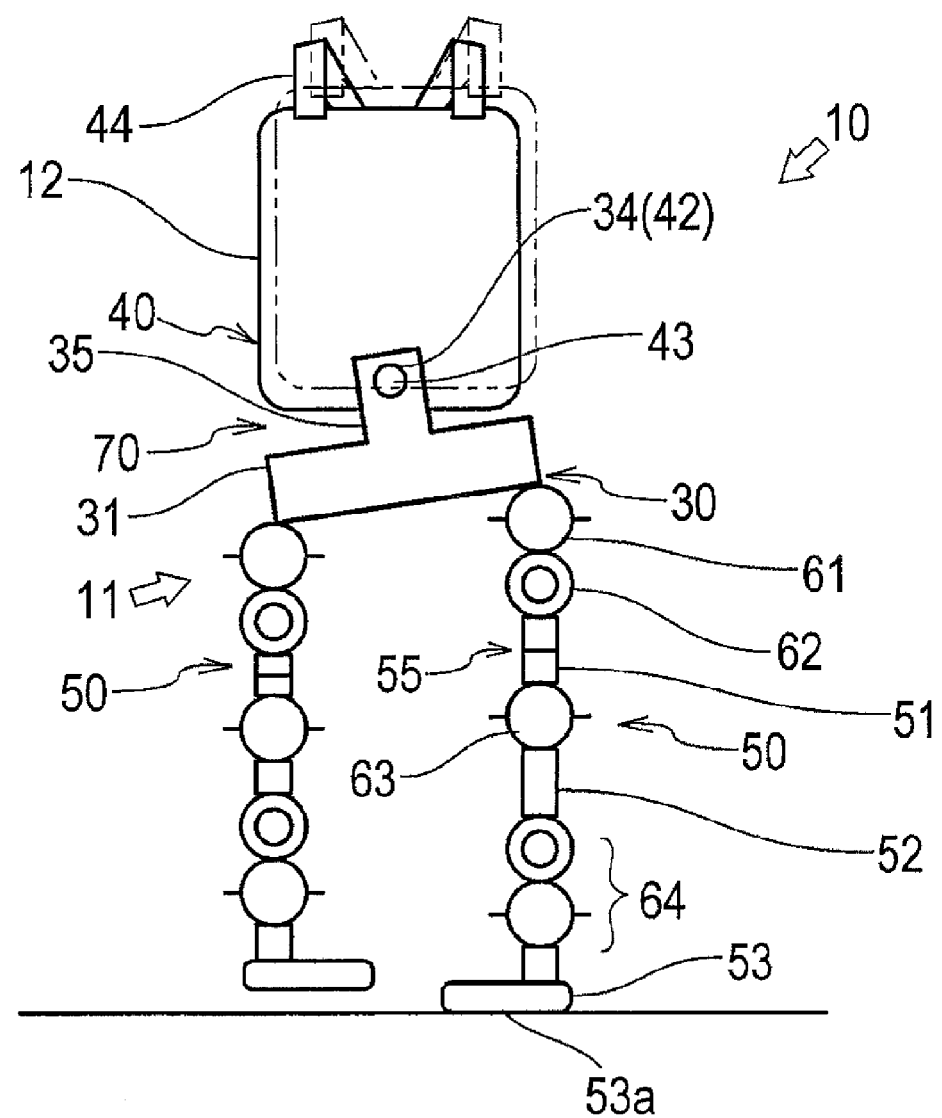
FIG. 12B is a schematic front view of a wearable motion supporting device showing the modification of the connection portion between the waist portion frame and the back portion frame, showing the one-leg standing state.

For example, while in the above-described embodiment, the connection portion 70 between the back portion frame 40 and the waist portion frame 30 is made of the four-node link mechanism, the configuration of the connection portion 70 is not limited to the foregoing. The connection portion 70 only needs to be a rotational mechanism of one DOF on the frontal plane that connects the back portion frame 40 and the waist portion frame 30. For example, in addition to the connection portion 70 described in the above-described embodiment, an auxiliary member may be added. Alternatively, for example, the connection portion 70 can be configured without using the four-node link mechanism. FIGS. 12A and 12B are schematic front views of the wearable motion supporting device showing a modification of the connection portion of the waist portion frame and the back portion frame, FIG. 12A showing the both-leg standing state, and FIG. 12B showing the one-leg standing state. In the example shown in FIG. 12A, a projected portion 35 with a joining hole 34 bored at an upper portion of the right-left center of the waist portion frame 30 is provided integrally with the waist portion frame 30. On the other hand, at a lower portion of the right-left center of the back portion frame 40, a joining hole 42 is provided. The joining hole 34 of the waist portion frame 30, the joining hole 42 of the back portion frame 40, and a shaft 43 inserted into these joining holes 34, 42 and extending perpendicular to the frontal plane make up the connection portion 70. This configuration makes the waist portion frame 30 and the back portion frame 40 as a rotational pair of one DOF on the frontal plane. Thus, as shown in FIG. 12B, even if the waist portion frame 30 swings from the horizontal on the frontal plane during walking of the wearer, the back portion frame 40 turns with respect to the waist portion frame 30, which prevents the swinging of the waist portion frame 30 from being propagated to the back portion frame 40. That is, the swing of the back portion frame 40 is suppressed, so that the scrape of the locking fixture 44 tying the back portion frame 40 on the wearer against the body of the wearer can be prevented.

Figure 13:
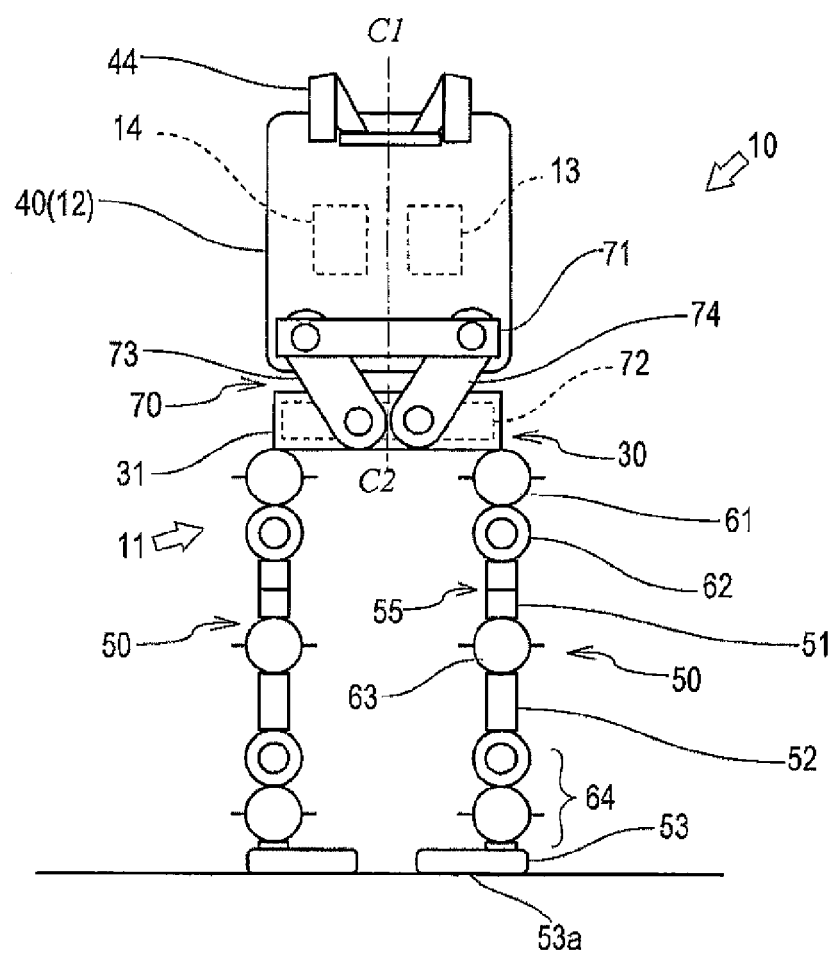
FIG. 13 is a schematic front view of a wearable motion supporting device showing a modification of the back portion frame.
Figure 14A:
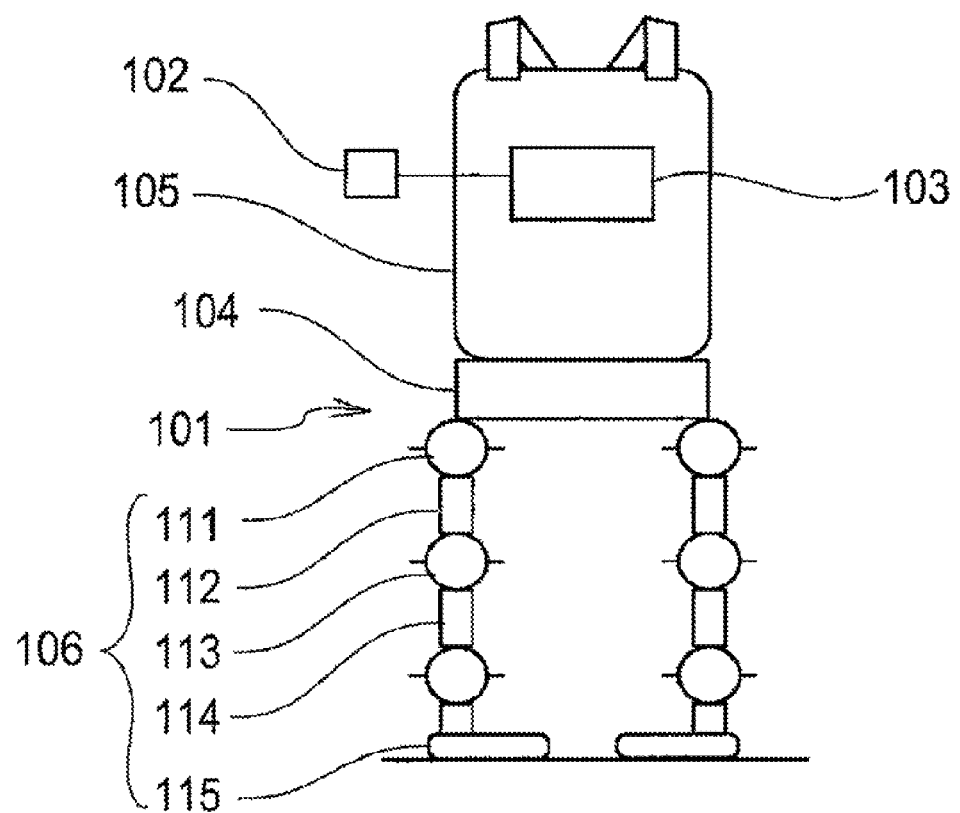
FIG. 14A is a front view of a conventional wearable motion assisting device, showing the both-leg standing state.
Figure 14B:
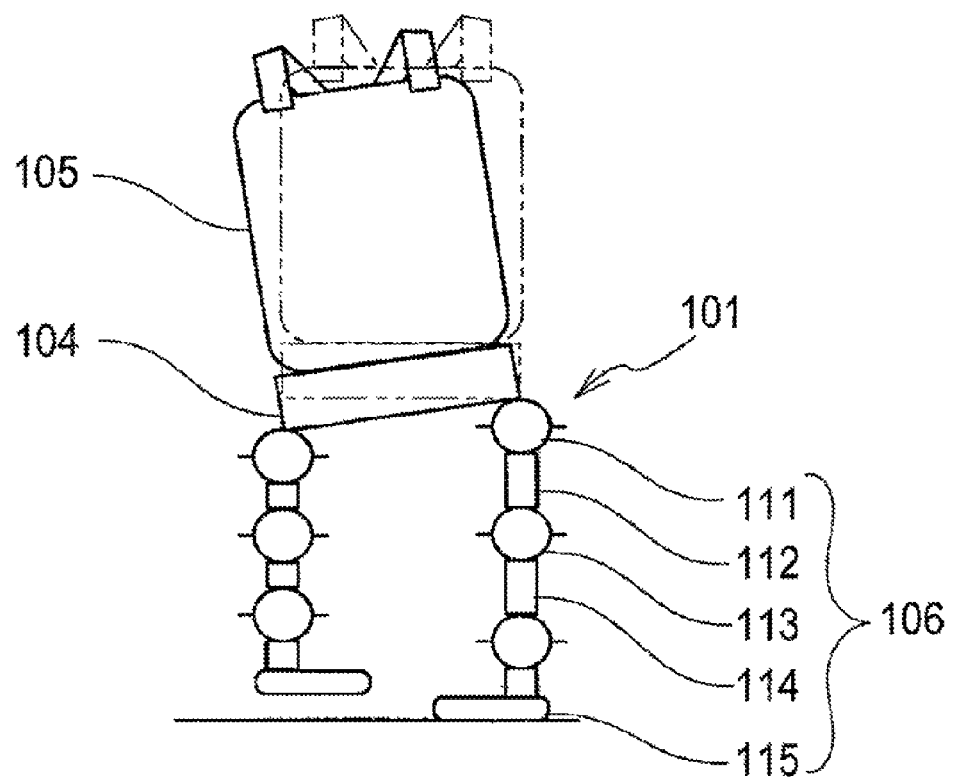
FIG. 14B is a front view of the conventional wearable motion assisting device, showing the one-leg standing state.
Figure 15:
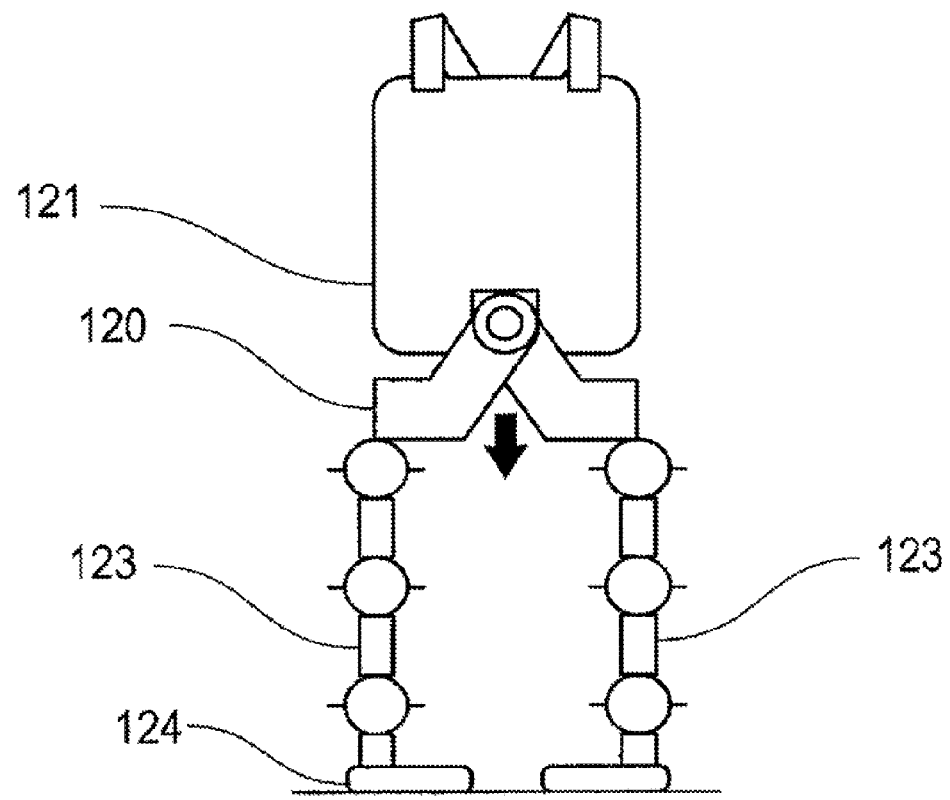
FIG. 15 is a front view of a conventional lower extremity exoskeleton device.

Moreover, for example, while in the above-described embodiment, the wearable motion supporting device 10 includes the back portion frame 40, and the load (the backpack 12) is carried on the back portion frame 40, the back portion frame 40 may be omitted from the configuration. In this case, as shown in FIG. 13, a housing itself of the backpack 12 is configured so as to function as the back portion frame 40. Specifically, the locking fixture 44 such as shoulder straps, hooks and the like to be tied on a back portion of the wearer, and the upper link 71 to connect to the waist portion frame 30 are provided in the housing of the backpack 12.

Moreover, for example, while in the above-described embodiment, the lower extremity frames 50 of the wearable motion supporting device 10 include the sole plates 53a, and the loads of the wearing fixture 11 and the backpack 12 are supported by these sole plates 53a, the sole plates 53a may be omitted from the configuration. The lower extremity frames 50 in this case are each made up of the actuator for hip joint 61, the joint for hip joint 62, the thigh arm 51, the actuator for knee joint 63 and the lower thigh arm 52. In the above-described wearable motion supporting device 10, the loads of the wearing fixture 11 and the backpack 12 are imposed on the wearer.

Different Embodiment 1

The above-described wearable motion supporting device may be configured as follows. A wearable motion supporting device according to Different Embodiment 1 is a wearable motion supporting device that assists or substitutes for muscle strength of a wearer, including lower extremity frames each having at least a thigh wearing portion that is worn on a thigh of the wearer and a lower thigh wearing portion that is worn on a lower thigh of the wearer, and a drive device provided in each of the lower extremity frames, wherein the drive device has a five-node link mechanism in which five links of an input link, a fixed link, an intermediate link, an output link, and a mediation link are rotatably connected in order, a DOF restricting mechanism that restricts a DOF of the five-node link mechanism to one by constraining relative displacement between the fixed link and the intermediate link and relative displacement between the intermediate link and the output link to a predetermined ratio, and an actuator that provides a rotary drive force around a connection portion with the fixed link to the input link, and the fixed link is provided in the thigh wearing portion, the output link is provided in the lower thigh wearing portion, and the actuator is provided in the thigh wearing portion. Hereinafter, a specific description will be given.

[Drive Device]

Figure 16:
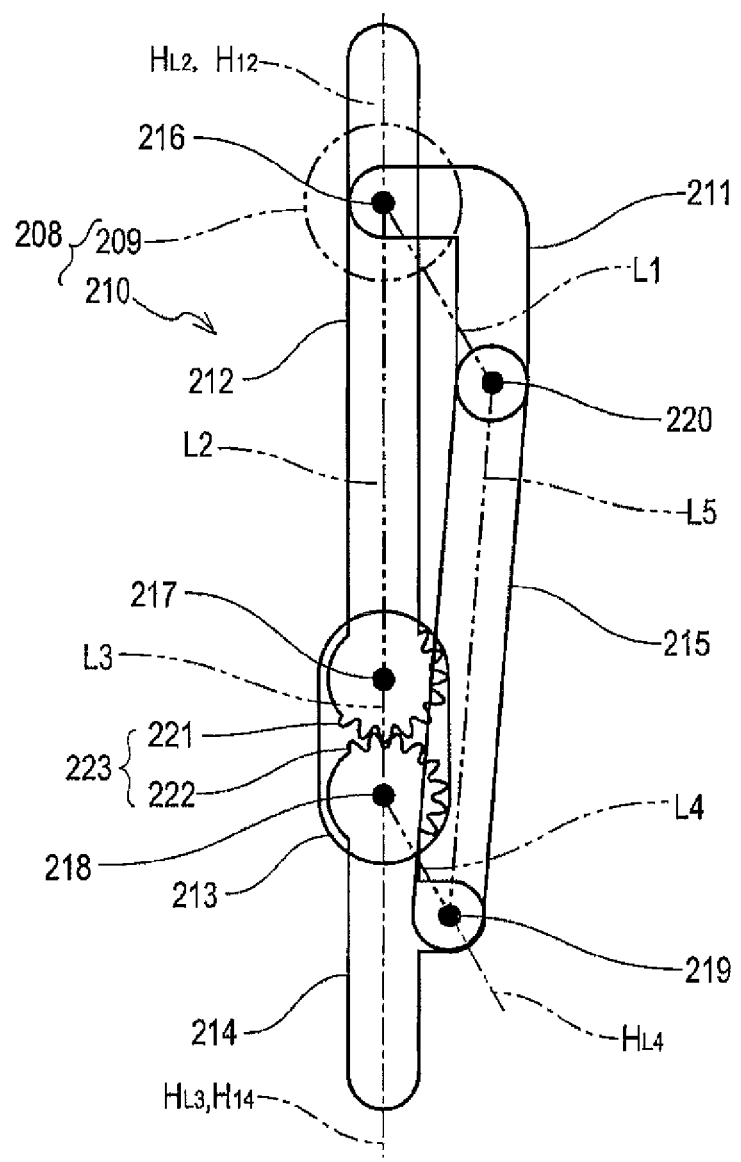
FIG. 16 is a view showing a schematic configuration of a drive device according to Different Embodiment 1.
Figure 17:
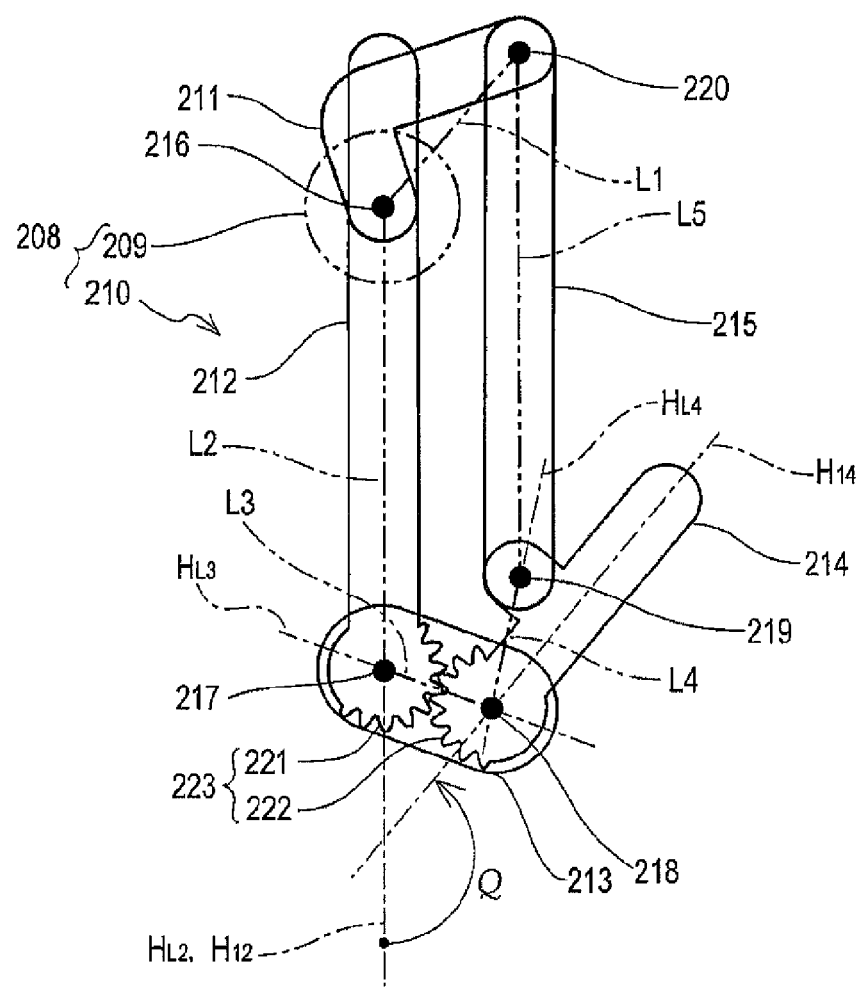
FIG. 17 is a view showing a state where an output link angle of the drive device in FIG. 16 is increased.

First, the drive device according to the present different embodiment will be described with reference to FIGS. 16 and 17. FIG. 16 is a view showing a schematic configuration of the drive device according to the present different embodiment, and FIG. 17 is a view showing a state where an output link angle of the drive device of FIG. 16 is increased. As shown in FIG. 16, a drive device 208 includes a five-node link mechanism 210 and an actuator 209 supplying power to the five-node link mechanism 210.

The five-node link mechanism 210 is a closed link mechanism in which five links of an input link 211, a fixed link 212, an intermediate link 213, an output link 214 and a mediation link 215 are rotatably connected in order. Specifically, the input link 211 and the fixed link 212 are connected turnably by an input shaft 216, the fixed link 212 and the intermediate link 213 are connected turnably by a connection shaft 217, the intermediate link 213 and the output link 214 are connected turnably by a connection shaft 218, the output link 214 and the mediation link 215 are connected turnably by a connection shaft 19, and the mediation link 215 and the input link 211 are connected turnably by a connection shaft 220. In the example shown in FIGS. 16, 17, the input shaft 216 and the respective connection shafts 217, 218, 219, 220 are parallel. Hereinafter, an inclination in a longitudinal direction $H_{L4}$ of the output link 214 to a longitudinal direction $H_{L2}$ of the fixed link 212 is referred to as an "output link angle Q". The output link angle Q is 0°, when the longitudinal direction $H_{L4}$ of the output link 214 and the longitudinal direction $H_{L2}$ of the fixed link 212 lie on a straight line (FIG. 16). Moreover, a virtual straight line connecting centers of the input shaft 216 and the connection shaft 217 is referred to as a "fixed link line $H_{L2}$". While in the example shown in FIGS. 16, 17, the longitudinal direction $H_{L2}$ of the fixed link 212, and the fixed link line HL2 overlap, these may not overlap in some aspects of the fixed link 212. Furthermore, a virtual straight line connecting between centers of the connection shaft 217 and the connection shaft 218 is referred to as an "intermediate link line $H_{L3}$", and a virtual curved line connecting between centers of the connection shaft 218 and the connection shaft 219 is referred to as an "output link line $H_{L4}$". In the example shown in FIGS. 16, 17, while the longitudinal direction $H_{L4}$ of the output link 214 and the output link line $H_{L4}$ do not overlap, these may overlap in some aspects of the output link 214.

The five-node link mechanism 210 includes a DOF restricting mechanism 223 to set a ratio of relative displacement between the fixed link 212 and the intermediate link 213 to relative displacement between the intermediate link 213 and the output link 214 to a predetermined value. Here, the relative displacement between the fixed link 212 and the intermediate link 213 means change in an angle formed by the fixed link line $H_{L2}$ and the intermediate link line $H_{L3}$. Moreover, the relative displacement between the intermediate link 213 and the output link 214 means change in an angle formed by the intermediate link line $H_{L3}$ and the output link line $H_{L4}$. This DOF restricting mechanism 223 constrains motions of the fixed link 212, the intermediate link 213 and the output link 214 mutually, thereby setting the DOF of the five-node link mechanism 210 to one.

The DOF restricting mechanism 223 according to the present different embodiment is made of a pair of gears engaged with each other, one of which is provided in the fixed link 212 and the other of which is provided in the output link 214. Specifically, a first gear 221 is provided at an end portion of the fixed link 212 on a side connected to the intermediate link 213, and a second gear 222 is provided at an end portion of the output link 214 on a side connected to the intermediate link 213, so that the first gear 221 and the second gear 222 are engaged. A gear ratio between the first gear 221 and the second gear 222 is not limited to 1:1, but gears different in number of teeth may be used as the first gear 221 and the second gear 222. Moreover, the gear ratio between the first gear 221 and the second gear 222 is not limited to a constant value, but may be varied during rotation. Furthermore, rows of teeth need not be provided in entire circumferences of the first gear 221 and the second gear 222, but the rows of teeth may be sufficiently provided so that the gears 221, 222 are engaged with each other at least in a movable range of the output link 214 relative to the fixed link 212, and the other portions may be flat and smooth. The DOF restricting mechanism 223 is not limited to the pair of gears. For example, in place of one or both of the first gear 221 and the second gear 222, a cam(s) may be used.

In the five-node link mechanism 210 having the above-described configuration, the fixed link 212 and the output link 214 are fixed by appropriate supporting structures (illustration is omitted), respectively, or make up parts of the supporting structures. When the input link 211 receives a rotary drive force around the input shaft 216 from the actuator 209, this rotary drive force is outputted at a predetermined reduction ratio from the output link 214 through the mediation link 215. In the five-node link mechanism 210, when the input link 211 rotates counterclockwise around the input shaft 216 from the state shown in FIG. 16, the output link 214 rotates counterclockwise around the connection shaft 218 through the mediation link 215 connected to the input link 211, as shown in FIG. 17, and the intermediate link 213 rotates counterclockwise around the connection shaft 217. Here, since by the action of the DOF restricting mechanism 223, the relative displacement between the fixed link 212 and the intermediate link 213, and the relative displacement between the intermediate link 213 and the output link 214 are constrained to the predetermined ratio (e.g., 1), not only the output link 214 but also the intermediate link 213 operates in association with the motion of the input link 211.

The five-node link mechanism 210 of the drive device 208 having the above-described configuration has a larger motion range than a four-node parallel-link mechanism. Particularly, when the output link angle Q of the five-node link mechanism 210 changes from 0° to a large angle (e.g., 140°), the intermediate link 213 intervenes between the fixed link 212 and the output link 214, which enables the configuration in which the fixed link 212 and the output link 214 do not interfere with each other, even when these links 212, 214 are arranged on the same plane. Furthermore, the configuration can be such that when the output link angle Q of the five-node link mechanism 210 changes from 0° to the large angle (e.g., 140°), a dead point is not included in this motion range. That is, in the five-node link mechanism 210, across a wide motion range (e.g., the range where the output link angle Q is 0° to) 140° of the output link 214, the existence of the intermediate link 213 prevents torque transmission from the input link 211 to the output link 214 from being unstable.

In the five-node link mechanism 210 of the drive device 208, as described before, the existence of the intermediate link 213 enables the fixed link 212 and the output link 214 to be arranged in the same plane. In addition, when the fixed link 212, the intermediate link 213 and the output link 214 are arranged linearly, as shown in FIG. 16, the input link 211 and the mediation link 215 can be formed along this straight line. In this manner, the five-node link mechanism 210 can be downsized more, that is, can be formed in an elongated shape along the fixed link 212. Furthermore, in this five-node link mechanism 210, when the output link 214 moves in a direction where the output link angle Q becomes larger (FIG. 17) from the state where the fixed link 212, the intermediate link 213 and the output link 214 lie on a straight line (FIG. 16), the input link 211 and the intermediate link 215 can be formed along these links 212, 213, 214, which enables the downsizing of the drive device 208.

[Wearable Motion Supporting Device]

Subsequently, referring to FIGS. 18 to 20, a substantial portion of a wearable motion supporting device (hereinafter, simply referred to as a motion supporting device) including the above-described drive device 208 will be described.

Figure 18:
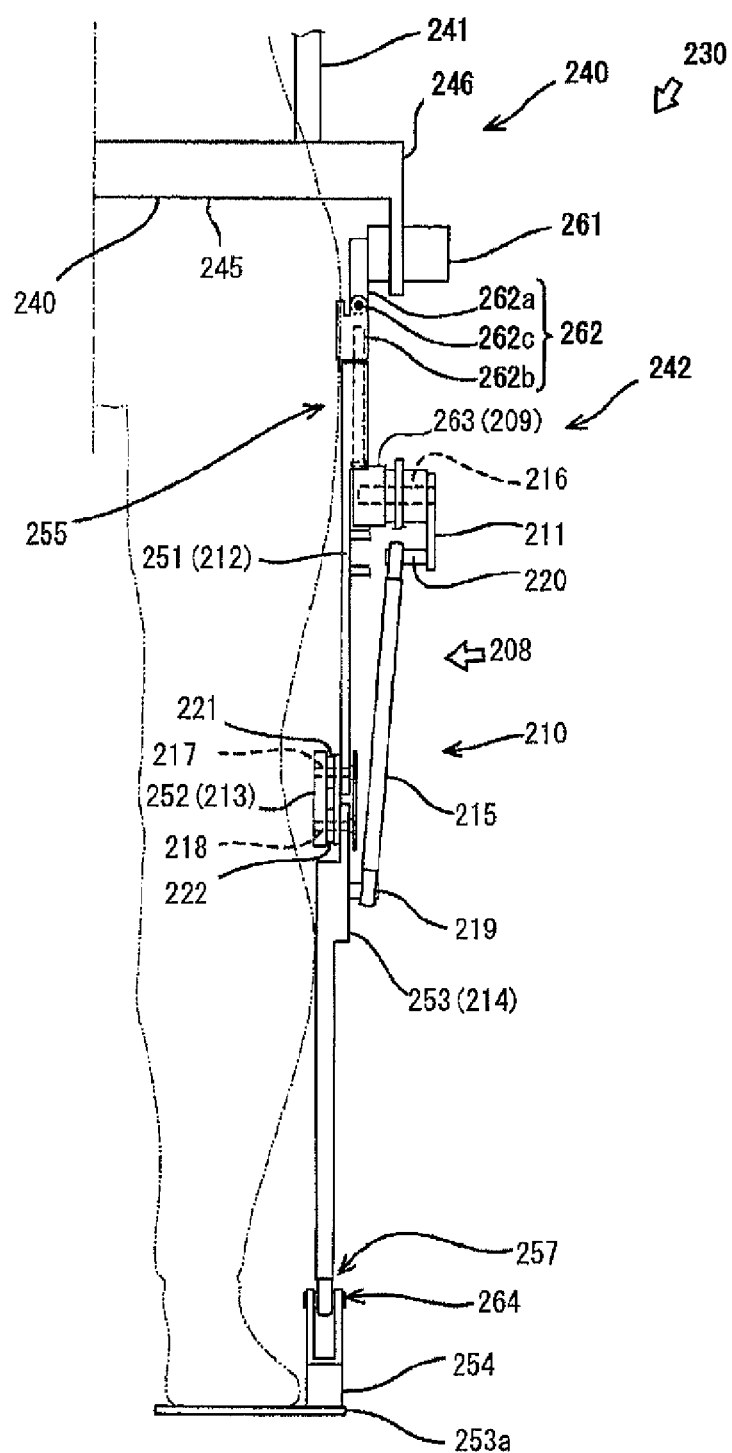
FIG. 18 is a front view showing a left lower portion of a wearable motion supporting device.
Figure 19:
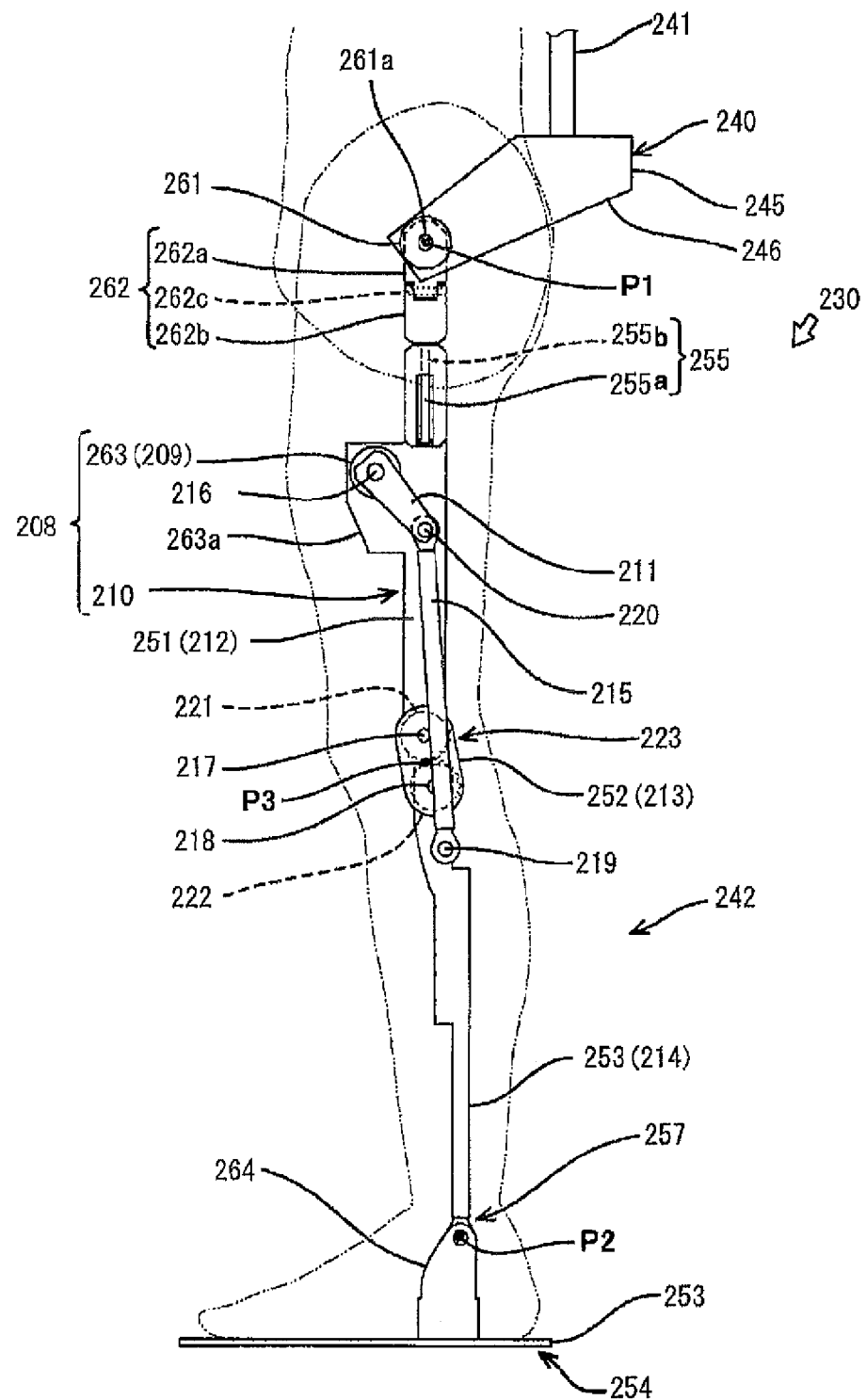
FIG. 19 is a side view showing the left lower portion of the wearable motion supporting device.
Figure 20:
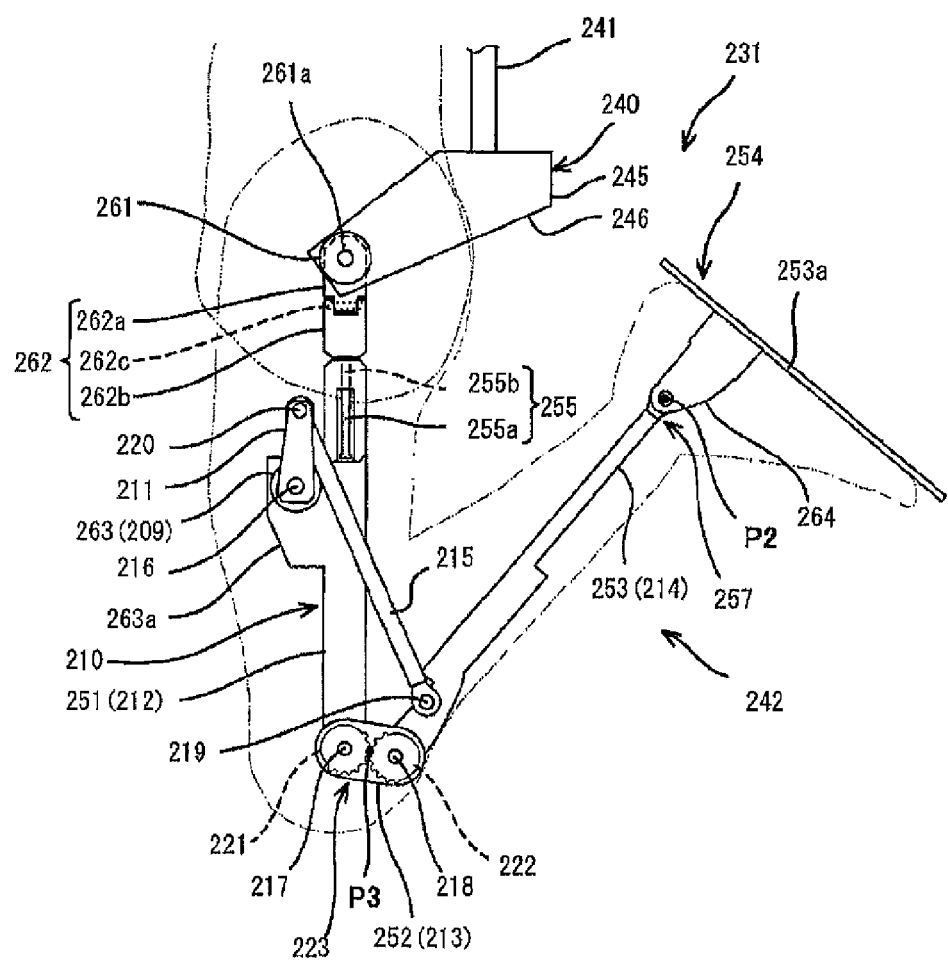
FIG. 20 is a side view showing the left lower portion of the wearable motion supporting device in a posture where a knee is bent.

As shown in FIGS. 18 and 19, to a lower end of a thigh arm 251 is turnably connected an upper end of an intermediate atm 252 through the connection shaft 217. A lower end of the intermediate arm 252 is turnably connected to an upper end of a lower thigh arm 253 through the connection shaft 218. The first gear 221 is provided at the lower end of the thigh arm 251, and the second gear 222 is provided at the upper end of the lower thigh arm 253, so that these engaged gears 221, 222 make up the DOF restring mechanism 223. The thigh arm 251, the intermediate arm 252 and the lower thigh arm 253 connected as described above make up a part of the five-node link mechanism 210. The thigh arm 251 corresponds to the fixed link 212, the intermediate arm 252 corresponds to the intermediate link 213, and the lower thigh arm 253 corresponds to the output link 214, respectively. An actuator for knee joint 263 supplying rotative power to the five-node link mechanism 210 is fixed to the thigh arm 251 through a bracket 263a and the like. The actuator for knee joint 263 is made up of, for example, a motor and a reduction gear. In this manner, the actuator for knee joint 263 is arranged on a waist side apart from the knee joint of the wearer, which can reduce a moment of inertia applied to the wearer, attributed to a weight of the actuator for knee joint 263 during walking of the wearer, as compared with a configuration where the actuator for knee joint 263 is arranged in the vicinity of the knee joint of the wearer.

One end of the input link 211 is fixed to an output shaft of the actuator for knee joint 263, that is, the input shaft 216 to the five-node link mechanism 210. Another end of the input link 211 is turnably connected to one end of the mediation link 215 through the connection shaft 220. Another end of the mediation link 215 is turnably connected to the lower thigh arm 253 through the connection shaft 219. In this manner, the drive device 208 made up of the five-node link mechanism 210 and the actuator for knee joint 263 (the actuator 209) is provided around a knee joint portion of a lower extremity frame 242. When the input link 211 receives a rotary drive force around the input shaft 216 from the actuator for knee joint 263, as shown in FIG. 20, the lower thigh arm 253 rotates around the connection shaft 218 through the mediation link 215 connected to the input link 211, and the intermediate arm 252 rotates around the connection shaft 217. Here, by the action of the DOF restricting mechanism 223, relative displacement between the thigh arm 251 and the intermediate arm 252, and relative displacement between the intermediate arm 252 and the lower thigh arm 253 are constrained to a predetermined ratio (e.g., I), and not only the lower thigh arm 253 but also the intermediate arm 252 operates in association with the motion of the input link 211.

In a motion supporting device 230 having the above-described configuration, a link length ratio of the five links of the five-node link mechanism 210 are set so as to be able to exert an optimum torque transmission ratio as the motion supporting device 230. That is, the link length ratio allows the torque transmission ratio to be adjusted so that a strong assist force can be exerted in a crouching posture, and alert back drive can be assured in an upright position even though the output of the actuator for knee joint 263 is constant. The above-described torque transmission ratio has a characteristic that it becomes larger as the output link angle Q is increasing in a range of 0° to 140°. Moreover, when the output link angle Q is in the range of 0° to 140°, the above-described torque transmission ratio preferably has a characteristic that it is less than 1 when the output link angle is 0°, and becomes larger than 1 when the output link angle Q is 90° or more. Particularly, the torque transmission ratio desirably has a small value close to 0 when the output link angle Q is in the vicinity of 0°. This allows the power to be effectively transmitted from the actuator for knee joint 263 to the lower thigh arm 253 as the output link in the crouching posture, which requires especially strong assist.

Figure 21:
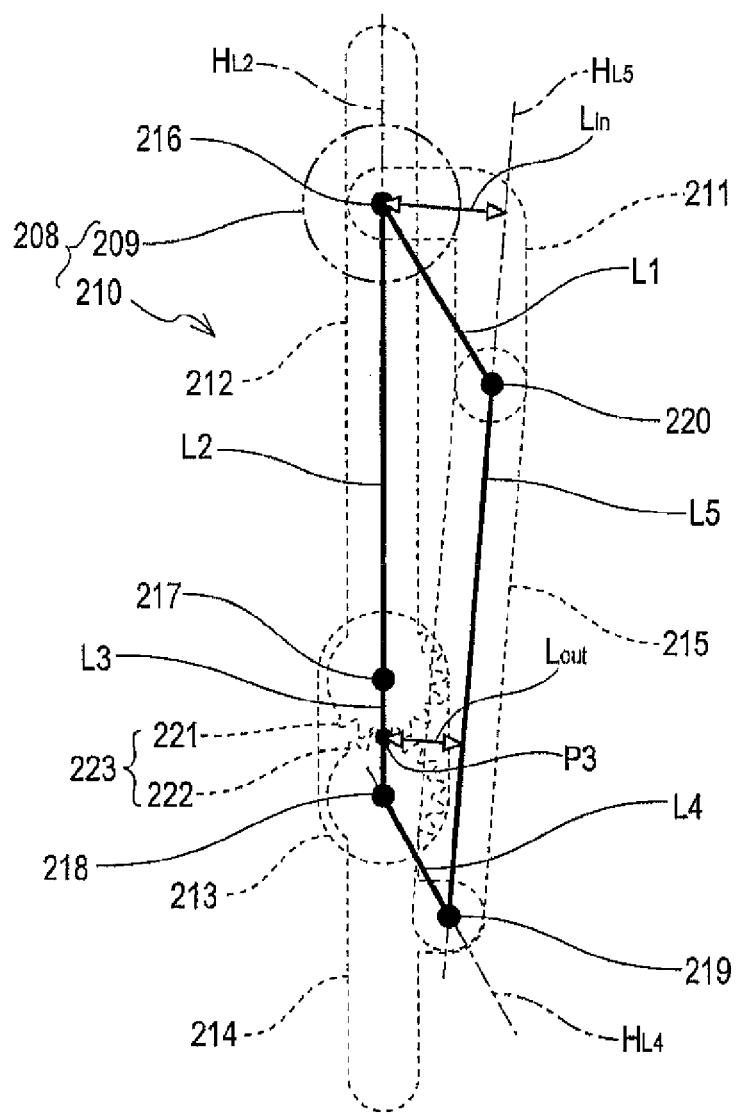
FIG. 21 is a view for describing a link length ratio and a torque transmission ratio of a five-node link mechanism included in the motion supporting device.
Figure 22:
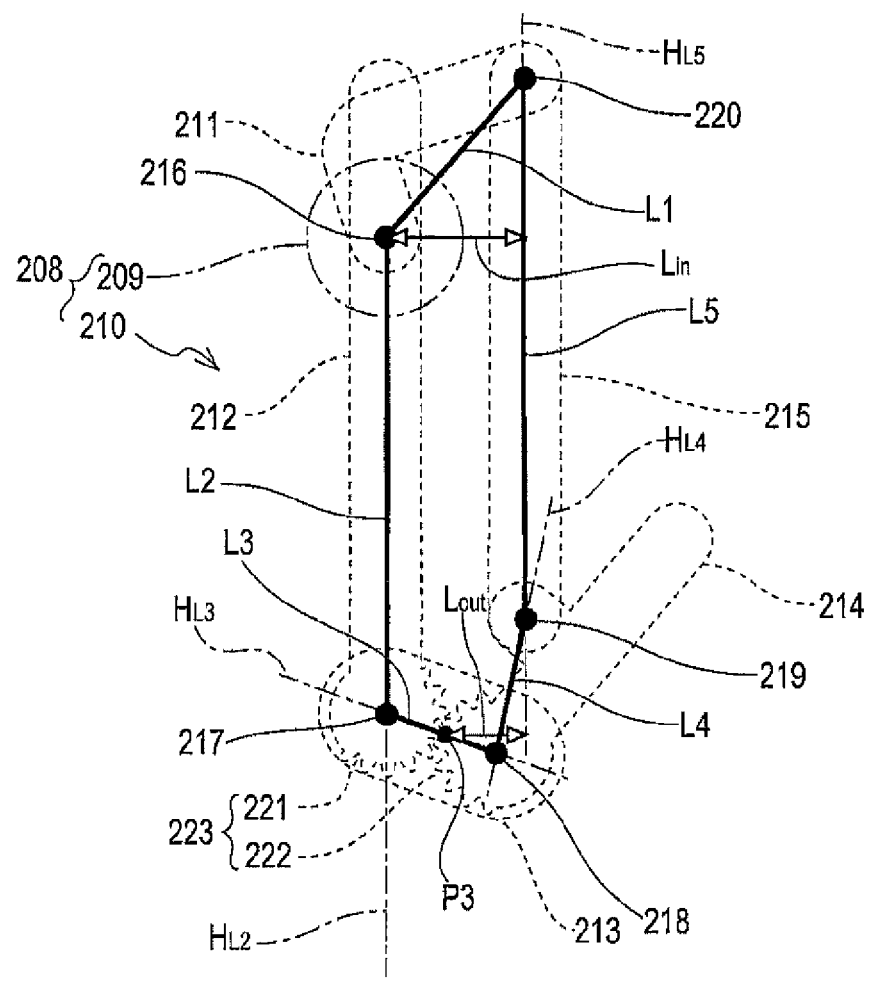
FIG. 22 is a view showing a state where an output link angle of the five-node link mechanism shown in FIG. 21 is increased.

FIG. 21 is a view for describing the link length ratio and the torque transmission ratio of the five-node link mechanism included in the motion supporting device, and FIG. 22 is a view showing a state where the output link angle of the five-node link mechanism shown in FIG. 21 is increased. In FIGS. 21 and 22, a distance between centers of the input shaft 216 and the connection shaft 220 is a link length L1 of the input link 211. Similarly, a distance between centers of the input shaft 216 and the connection shaft 217 is a link length L2 of the fixed link 212. A distance between centers of the connection shaft 217 and the connection shaft 218 is a link length L3 of the intermediate link 213. A distance between centers of the connection shaft 218 and the connection shaft 219 is a link length L4 of the output link 214. A distance between centers of the connection shaft 219 and the connection shaft 220 is a link length L5 of the mediation link 215. Moreover, $L_{in}$ denotes a length of a perpendicular line drawn from the center of the input shaft 216 to a mediation link line $H_{L5}$, and is defined as an input perpendicular line distance Lin. Here, the mediation link line $H_{L5}$ is a virtual straight line connecting the centers of the connection shaft 219 and the connection shaft 220. $L_{out}$ denotes a length of a perpendicular line drawn from an engagement point P3 between the first gear 221 and the second gear 222 to the mediation link line $H_{L5}$, and is defined as an output perpendicular line distance $L_{out}$. The input perpendicular line distance $L_{in}$ and the output perpendicular line distance $L_{out}$ take values depending on the five link lengths L1, L2, L3, L4, L5. A value obtained by dividing the output perpendicular line distance $L_{out}$ by the input perpendicular line distance $L_{in}$ is the torque transmission ratio (=$L_{out}/L_{in}$).

The following mathematical expressions 1 and 2 are conditional expressions indicating dead points of the five-node link mechanism 210 included in the motion supporting device 230. The five-node link mechanism 210 is designed in a range where mathematical expressions 1 and 2 are not satisfied, by which a situation can be avoided, where the five-node link mechanism 210 included in the motion supporting device 230 reaches the dead points.

$$[L2+L4\times\cos(Q_{L0})+L3\times\cos(r\times Q_{L0})]^2+[L4\times\sin(Q_{L0})+L3\times\sin(r\times Q_{L0})]^2\times(L1+L5)^2 \quad (1)$$

$$[L2+L4\times\cos(Q_{Lf})+L3\times\cos(r\times Q_{Lf})]^2+[L4\times\sin(Q_{Lf})+L3\times\sin(r\times Q_{Lf})]^2\times(L1+L5)^2 \quad (2)$$

In mathematical expressions 1 and 2, $Q_{L0}$ and $Q_{Lf}$ are angles formed by the fixed link line $H_{L2}$ and the output link line $H_{L4}$. $Q_{L0}$ is an angle formed by the fixed link line $H_{L2}$ and the output link line $H_{L4}$ when the knee joint of the wearer extends most (the upright posture), and $Q_{Lf}$ is an angle formed by the fixed link line $H_{L2}$ and the output link line $H_{L4}$ when the knee joint of the wearer bends most (the crouching position). Moreover, r is $1/(1+ny)$, where ny is the ratio of the relative displacement between the fixed link 212 and the intermediate link 213. As in the present different embodiment, the engaged gears 221, 222 are used as the DOF restricting mechanism 223, and if the gear ratio thereof is 1:1, ny=1.

A technique of finding the link length ratio, using mathematical expressions 1 and 2 will be described, taking a specific example (not shown) when the mediation link length L5 is decided. First, the link lengths (L1, L2, L3, L4) other than the mediation link length L5 are decided in accordance with physical dimensions of the wearer. For example, the input link length L1=60 mm, the fixed link length L2=210 mm, the intermediate link length L3=40 mm, the output link length L4=50 mm. Respective values of ny, $Q_{L0}$, and $Q_{Lf}$ are decided in accordance with the configuration of the motion supporting device 230. For example, ny=1, $Q_{L0}$=0°, $Q_{Lf}$=140°. These numerical value conditions are substituted into mathematical expressions 1 and 2 to find the mediation link length L5. Consequently, in mathematical expression 1, the mediation link length is calculated as L5=240 mm, and in mathematical expression 2, the mediation link length is calculated as L5=258 mm. The value of the mediation link length L5 is selected from values larger than a lower limit of the mediation link length L5 and smaller than an upper limit thereof, which values are calculated, using mathematical expressions 1 and 2 as described above. Here, for example, by taking an intermediate value between the solution of mathematical expression 1 and the solution of mathematical expression 2, the mediation link length L5=250 mm is selected. The torque transmission ratio in the link length ratio found as described above (the input link length L1=60 mm, the fixed link length L2=210 mm, the intermediate link length L3=40 mm, the output link length L4=50 mm, the mediation link length L5=250 mm) is as shown in Table 1.

TABLE 1

| Output link angle | 0° | 35° | 70° | 90° | 105° | 140° |
|---|---|---|---|---|---|---|
| Torque transmission ratio | 0.23 | 0.78 | 0.97 | 1.02 | 1.14 | 2.12 |

In change of the torque transmission ratio shown in Table 1 to the output link angle, when the output link angle is 0°, the torque transmission ratio has a sufficiently small value close to 0, and when the output link angle is 90° or more, the torque transmission ratio is larger than 1. The torque transmission ratio increases with increase of the output link angle to reach a maximum value at the maximum output link angle (140°) shown in Table 1. In this manner, by the link length ratio decided by the above-described technique, the torque transmission ratio of the five-node link mechanism 210 included in the motion supporting device 230 is preferably set for the motion supporting device 230.

The motion supporting device 230 according to the present different embodiment described above includes the drive device 208 having the five-node link mechanism 210, by which across a wide motion range (e.g., a range where the output link angle Q is 0° to 140°) of the lower thigh arm 253 (the output link 214), the thigh arm 251 and the lower thigh arm 253 do not interfere and reach the dead point, even when these arms 251, 253 are arranged in the same plane. Thus, across the wide motion range of the lower thigh arm 253, the torque is transmitted to the lower thigh arm 253 stably. This enables the motion supporting device 230 to address the wide motion range of 0° to 140° of the knee joint of a human.

Furthermore, inclusion of the drive device 208 in the motion supporting device 230 according to the present different embodiment can downsize the device more while assuring the above-described wide motion range. Specifically, the lower thigh arm 253 and the thigh arm 251 are arranged on almost the same sagittal plane, which suppresses increase in thickness in the right-left direction of the lower extremity frame 242. In addition, in the upright posture of the wearer, on the sagittal plane (FIG. 19), an upper end P1 of the thigh arm 251, a lower end P2 of the lower thigh arm 253, and the connection shaft 217 between the thigh arm 251 and the intermediate arm 252 are arranged on substantially the same straight line, which suppresses increase in thickness in the anteroposterior direction of the lower extremity frame 242. In FIG. 19, the upper end P1 of the thigh arm 251 indicates a connection portion between the waist portion frame 240 and the lower extremity frame 242.

As shown in FIG. 19, the upper end P1 of the thigh arm 251 is located lateral to the hip joint of the wearer, and the lower end P2 of the lower thigh arm 253 is located lateral to the heel of the wearer. In sagittal plane view, a straight line connecting these points (P1 and P2) extends on a back surface side with respect to the knee joint of the wearer, and the connection shaft 217 and the connection shaft 218 are almost located on this straight line. The above-described arrangement of the connection shafts 217, 218 allows a basic portion of the lower extremity frame 242 made up of the thigh arm 251, the intermediate arm 252 and the lower thigh arm 253 to form a linear shape. In this manner, by the basic portion of the lower extremity frame 242 forming the almost linear shape, a load located above the knee joint portion (the intermediate arm 252) of the lower extremity frame 242 can be supported passively by the basic portion of the lower extremity frame 242. The input link 211 and the mediation link 215 can be formed along the thigh arm 251, the intermediate arm 252 and the lower thigh arm 253, which are arranged linearly as described above. Furthermore, in the state where the output link angle increases, the input link 211 and the mediation link 215 can be formed along the thigh arm 251. As a result of forming the five-node link mechanisms 210 in this manner, both in the upright posture and in the crouching posture, the lower extremity frame 242 and a part thereof are not largely projected to a front side or a rear side of the wearer, and the lower extremity frame 242 extends along the lower extremity of the wearer, which makes the lower extremity frame 242 compact.

In a conventional motion supporting device in which a thigh arm and a lower thigh arm are connected by a knee joint shaft, when the knee joint shaft is arranged on the back surface side from the knee joint of the wearer, a distance from a site of the body of the wearer where the knee joint shaft is arranged to the heel of the wearer is reduced as the wearer is bending his or her knee. Change of this distance causes a problem such as deviation between the body of the wearer and the wearing fixture. In contrast, in the motion supporting device 230 according to the present different embodiment, the above-described problem is avoided or reduced. As shown in FIG. 19, when the wearer is in the upright posture, in sagittal plane view, the connection shaft 218, the engagement point P3 of the gears 221, 222, and the lower end P2 of the lower thigh arm 253 are arranged almost on a straight line. As shown in FIG. 20, as the wearer is bending his or her knee, the connection shaft 218 is moving away from a straight line connecting the engagement point P3 of the gears 221, 222 and the lower end P2 of the lower thigh arm 253, and thus, a length of the line connecting the engagement point P3 of the gears 221, 222 and the lower end P2 of the lower thigh arm 253 is reducing. That is, when the wearer bends his or her knee, with reduction in the distance from the site of the body of the wearer where the engagement point P3 of the gears 221, 222 is arranged to the heel of the wearer, the length of the line connecting the engagement point P3 of the gears 221, 222 and the lower end P2 of the lower thigh arm 253 is also reducing, so that the deviation between the body of the wearer and the wearing fixture can be avoided or reduced.

Different Embodiment 2

Furthermore, the foregoing wearable motion supporting device may be configured as follows. That is, a wearable motion supporting device according to Different Embodiment 2 includes a lower extremity wearing portion that is worn on at least one of right and left lower extremity portions of a user, and the lower extremity wearing portion has a below-knee frame portion located below a knee portion of the user, an above-knee frame portion located above the knee portion of the user, a knee drive device that rotates and drives the above-knee frame portion with respect to the below-knee frame portion with a vicinity of the knee portion of the user serving as an axis, a buttock supporting member that is attached to the above-knee frame portion, and makes contact with a border portion between a thigh and a buttock of the user to push up the buttock of the user by the knee drive device rotating and driving the above-knee frame portion in a direction raising the same in a state where the user crouches, and a suspension member that is attached to the above-knee frame portion, and extends through a front surface in the vicinity of a base of the thigh of the user and an inseam to be connected to the buttock supporting member, and suspend the buttock supporting member. Hereinafter, a specific description will be given.

[Buttock Supporting Member]

Figure 25:
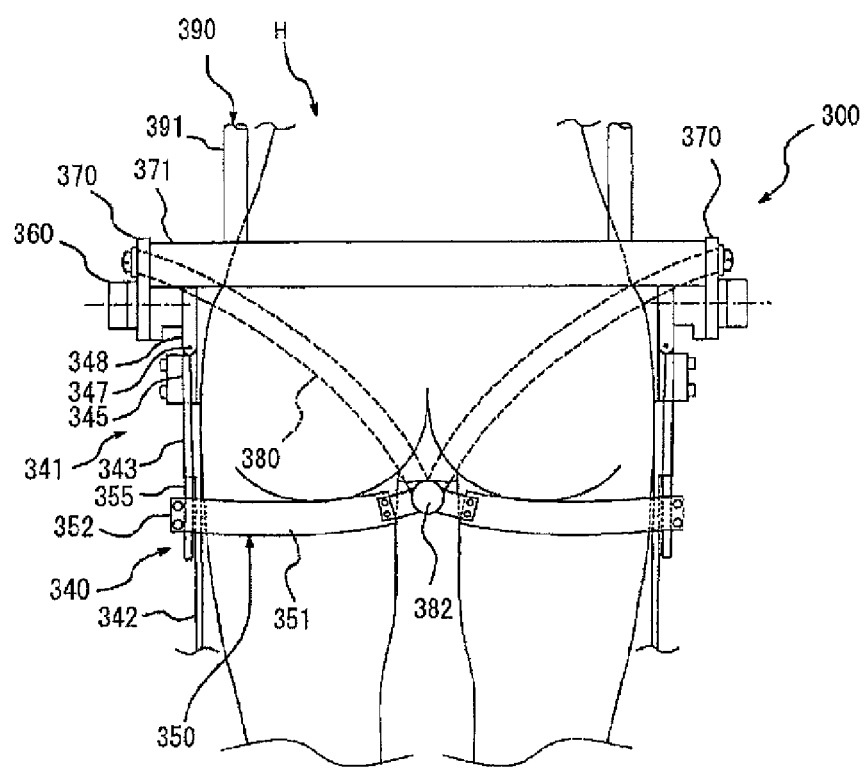
FIG. 25 is a back view of the wearable motion supporting device shown in FIG. 23.
Figure 26:
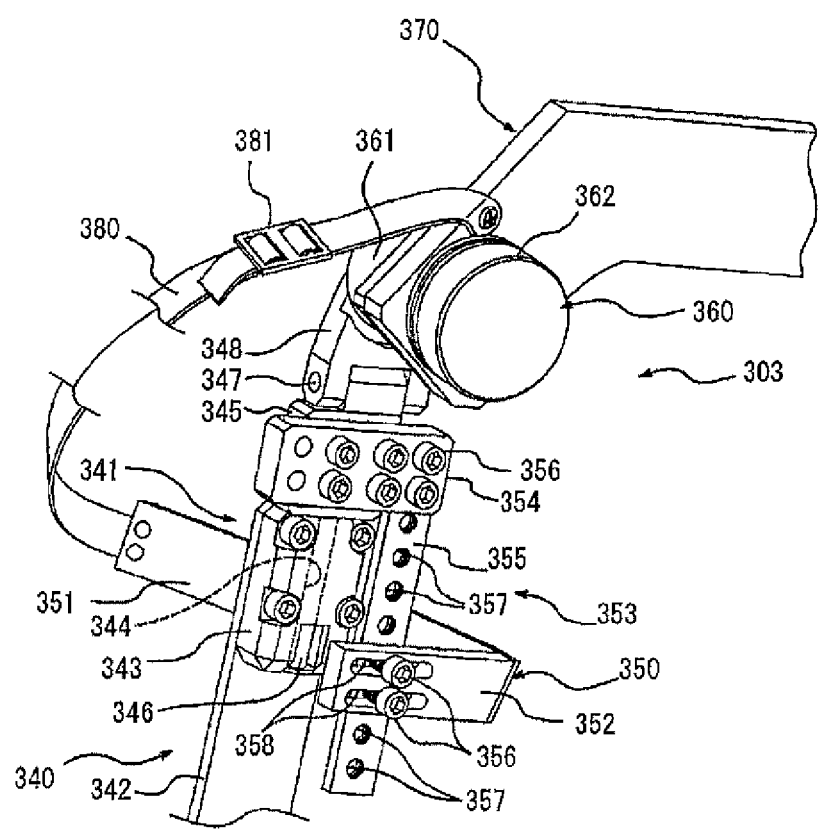
FIG. 26 is a perspective view of the wearable motion supporting device shown in FIG. 24.

First, referring to FIGS. 25 and 26, a buttock supporting member 350 will be described. The buttock supporting member 350 of the present different embodiment is a member that supports a vicinity of a buttock of a user H. As shown in FIG. 26, the buttock supporting member 350 according to the present different embodiment has an L shape, and is mainly made up of a buttock contact portion 351 and a frame connecting portion 352. Respective configurations are as follows.

The buttock contact portion 351 is a portion in contact with the border portion between the thigh and the buttock. In this border portion between the thigh and the buttock, subcutaneous fat is thin, so that force from the buttock contact portion 351 is easily transmitted to the vicinity of the buttock. The buttock contact portion 351 has both flexibility and rigidity, and can be made of, for example, a thin metal plate and a resin plate. As shown in FIG. 26, the buttock contact portion 351 extends in the right-left direction, and strictly speaking, a front surface thereof faces obliquely upward, and the whole thereof is curved along a shape of the buttock. Thereby, when the buttock contact portion 351 makes contact with the above-described border portion, contact pressure is dispersed, so that the user H can obtain a favorable fit feeling. Moreover, as shown in FIG. 25, the buttock contact portion 351 is formed so that an inner forefront thereof does not reach the inseam of the user H. A cushion material such as sponge and urethan may be pasted on a front surface of the buttock contact portion 351.

The frame connecting portion 352 is a portion connecting the foregoing buttock contact portion 351 and a thigh frame 340. As shown in FIG. 26, the frame connecting portion 352 is formed of a metal plate having a thickness, and has a higher rigidity than the buttock contact portion 351. Moreover, the frame connecting portion 352 and the buttock contact portion 351 are connected orthogonally to each other. In the frame connecting portion 352, long holes 358 extending in the anteroposterior direction are formed at two upper and lower positions, and bolts 356 penetrating these long holes 358 are inserted into bolt holes 357 of the foregoing second adjustment member 355. Loosening these bolts 356 enables the frame connecting portion 352 to slide in the anteroposterior direction with respect to the thigh frame 340, and tightening the bolts 356 allows a position of the frame connecting portion 352 to be fixed. With this configuration, a position in the anteroposterior direction of the buttock supporting member 350 can be adjusted in accordance with a body type of the user H. The buttock contact portion 351 and the frame connecting portion 352 may be integrally formed of a metal material or a resin material.

[Suspension Member]

Figure 23:
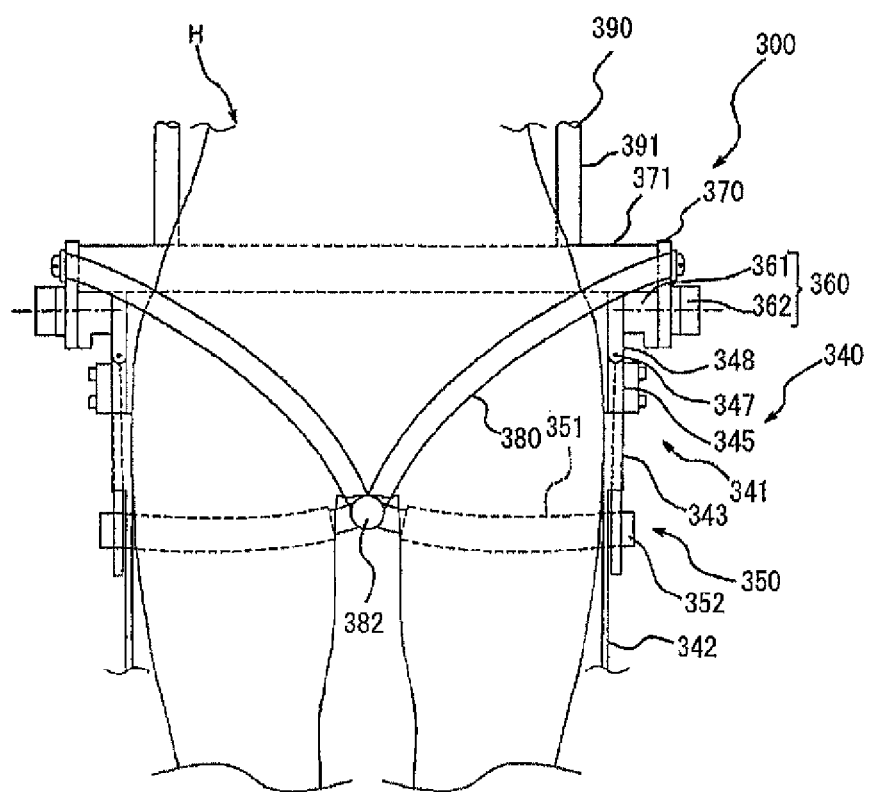
FIG. 23 is an enlarged view in the vicinity of a waist portion of a wearable motion supporting device according to Different Embodiment 2.
Figure 24:
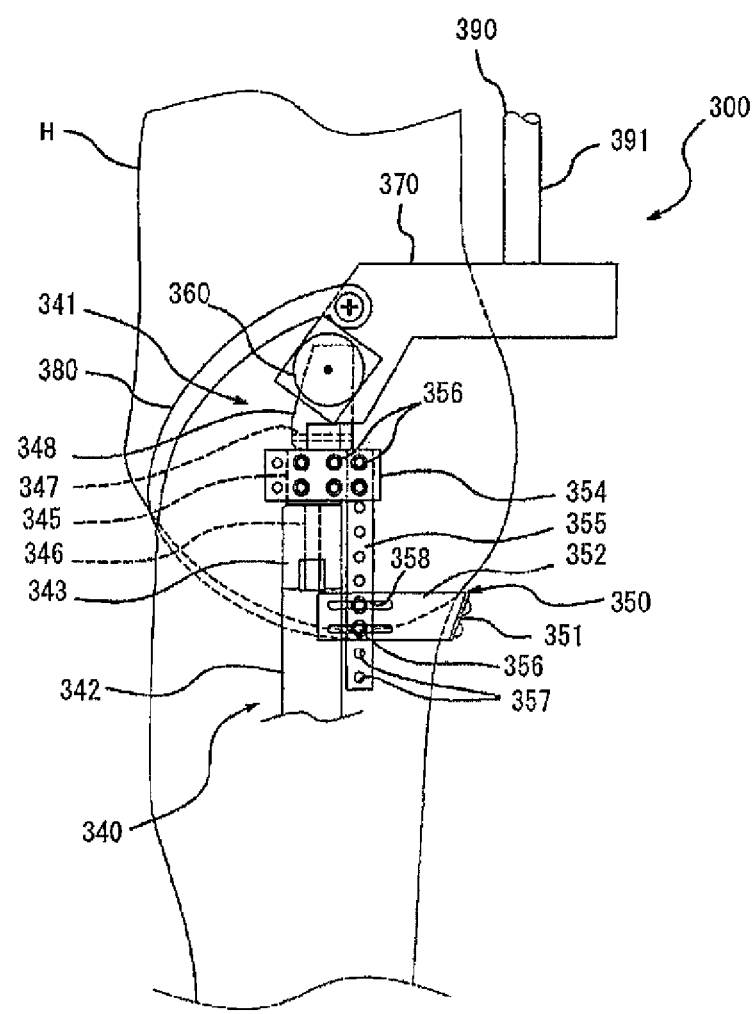
FIG. 24 is a left side view of the wearable motion supporting device shown in FIG. 23.

Next, referring to FIGS. 23 to 26, a suspension member 380 will be described. The suspension member 380 of the present different embodiment is a member for suspending the buttock supporting member 350. As shown in FIG. 24, the suspension member 380 is attached to a pelvis frame 370 at an upper end portion thereof, and extends from here through a front surface side of the base of the thigh of the user H and the inseam to be attached to an inner portion of the buttock supporting member 350 at a lower end portion thereof. Thereby, the buttock supporting member 350 is attached to the thigh frame 340 on an outer side in the right-left direction, and is suspended on an inner side in the right-left direction by the suspension member 380 (refer to FIG. 26). That is, the buttock supporting member 350 is in a state where both ends are supported.

Moreover, since the suspension member 380 is attached to the pelvis frame 370 as described above, it is attached to an above-knee frame portion 303 (a portion made up of the thigh frame 340, a pelvis drive device 360 and the pelvis frame 370) above the buttock supporting member 350. This allows the buttock supporting member 350 and the suspension member 380 to extend spirally as a whole, so that the suspension member 380 is worn along a border (so-called V line) between the waist portion and the thigh from a crotch of the user H. Therefore, the suspension member 380 can securely lift the buttock supporting member 350, and when the user H performs motions such as walking, crouching, and rising, the scrape of the suspension member 380 against the waist portion and the thigh can be reduced. As shown in FIG. 24, in the present different embodiment, the suspension member 380 is attached to the pelvis frame 370 above the pelvis drive device 360.

Moreover, the suspension member 380 is formed with a lower rigidity than that of the buttock supporting member 350, and can be formed of, for example, a nylon belt, a leather belt, a band or the like. The suspension member 380 has the lower rigidity in this manner, in other words, has large flexibility, which can reduce an uncomfortable feeling that the user H would be given. Moreover, as shown in FIG. 26, the suspension member 380 has an adjustment member 81 that adjusts a whole length thereof to enhance the fit feeling. Furthermore, as shown in FIG. 23, the right-left suspension members 380 are connected to each other in the inseam. More specifically, the right and left suspension members 380 may be tied to form a knot 382, or may be connected by passing both the right and left suspension members 380 through a tubular member. Connecting the right and left suspension members 380 in this manner makes it difficult for the suspension members 380 to dig into the thighs, thereby enhancing the fit feeling more.

[Operation of Wearable Motion Supporting Device]

Figure 27:
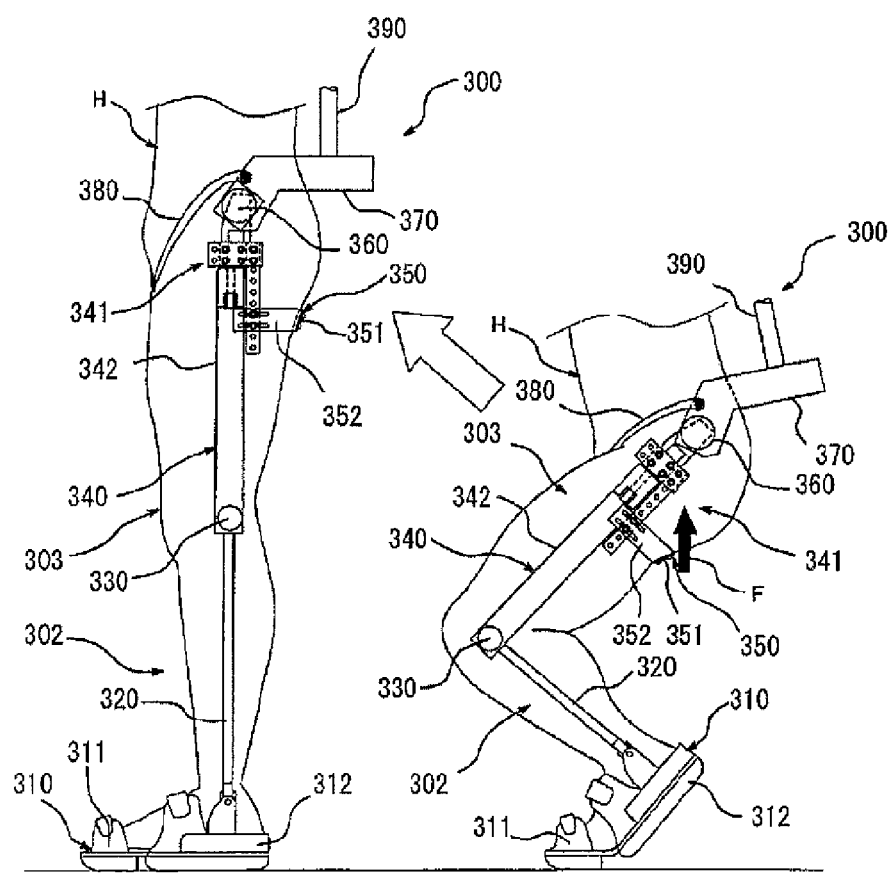
FIG. 27 is left side views of the wearable motion supporting device according to Different Embodiment 2, the right view showing a state where a user crouches down, and the left view showing a state where the user rises up.

Next, referring to FIG. 27, operation of a wearable motion supporting device 300 according to the present different embodiment will be described. Here, the operation of the wearable motion supporting device 300 from a state where the user crouches down to a state where he or she has risen up will be described. As shown in a right view of FIG. 27, in the state where the user H crouches down, a lower thigh frame 320 is inclined forward and the thigh frame 340 is inclined rearward with respect to the ground. Moreover, the pelvis frame 370 is inclined so that a rear portion thereof is slightly higher than the horizontal. When the user H rises up from this state, a knee drive device 330 rotates and drives the thigh frame 340 in a direction where it is raised with respect to the lower thigh frame 320 (in a counterclockwise direction in the right view of FIG. 27). This allows the buttock supporting member 350 to push up the buttock of the user (refer to black arrow F in the figure), so that the user can rise up easily (refer to a left view of FIG. 27). Moreover, in synchronization with this operation, the pelvis drive device 360 rotates and drives the pelvis frame 370 with respect to the thigh frame 340 in an opposite direction of the turning direction of the thigh frame 340 (in a clockwise direction in the right view of FIG. 27) to make adjustment to prevent the pelvis frame 370 (a back portion frame 390) from being largely inclined with respect to the ground.

As described above, according to the wearable motion supporting device 300 of the present different embodiment, at least the motion of rising up from the crouching state can be assisted. In addition, since the buttock supporting member 350 that pushes up the vicinity of the buttock of the user H has the very simple structure, wearing on the user H is easy. Additionally, in spite of the above-described simple structure, the buttock supporting member 350, which is suspended by the suspension member 380 extending through inseam from the front side of the base of the thigh of the user H, can securely support the buttock of the user H. Moreover, in the present different embodiment, since the buttock supporting member 350 and the suspension member 380 are configured so as to extend spirally as a whole, the suspension member 380 can securely lift the buttock supporting member 350 when the user H rises up.

The suspension member 380 may be configured to have elasticity so that the buttock supporting member 350 is lifted by an elastic force of the suspension member 380. That is, the whole suspension member 380 may be formed by an elastic member such as rubber and the like, a part thereof such as an upper end portion and the like may be formed of a tension spring or the like, or may have a configuration other than the foregoing.

While the buttock supporting member 350 is located on the buttock side in the border portion between the thigh and the buttock in the state where the user H rises up, a position of the buttock supporting member 350 relatively moves to the thigh side, when the user H changes his or her posture into the crouching state. That is, when the user H crouches down, the buttock supporting member 350 relatively moves from the buttock side to the thigh side. Since the thigh has less swelling than the buttock, crouching of the user H causes a gap between the buttock supporting member 350 and the above-described border portion (hereinafter, this gap is referred to as a "buttock gap"). Furthermore, in the foregoing different embodiment, the crouching of the user H causes the pelvis frame 370 to turn, so that the pelvis frame 370 pushes out the suspension member 380 forward, by which the buttock gap tends to become larger. If the buttock gap becomes larger in the crouching state, the user H cannot be assisted quickly when the user rises up.

In contrast, in the case where the suspension member 380 has elasticity, since the buttock supporting member 350 is also lifted by the suspension member 380 when the user H crouches down, increase of the buttock gap can be suppressed. Thus, when the user H rises up, the user can be assisted comparatively quickly.

Figure 28:
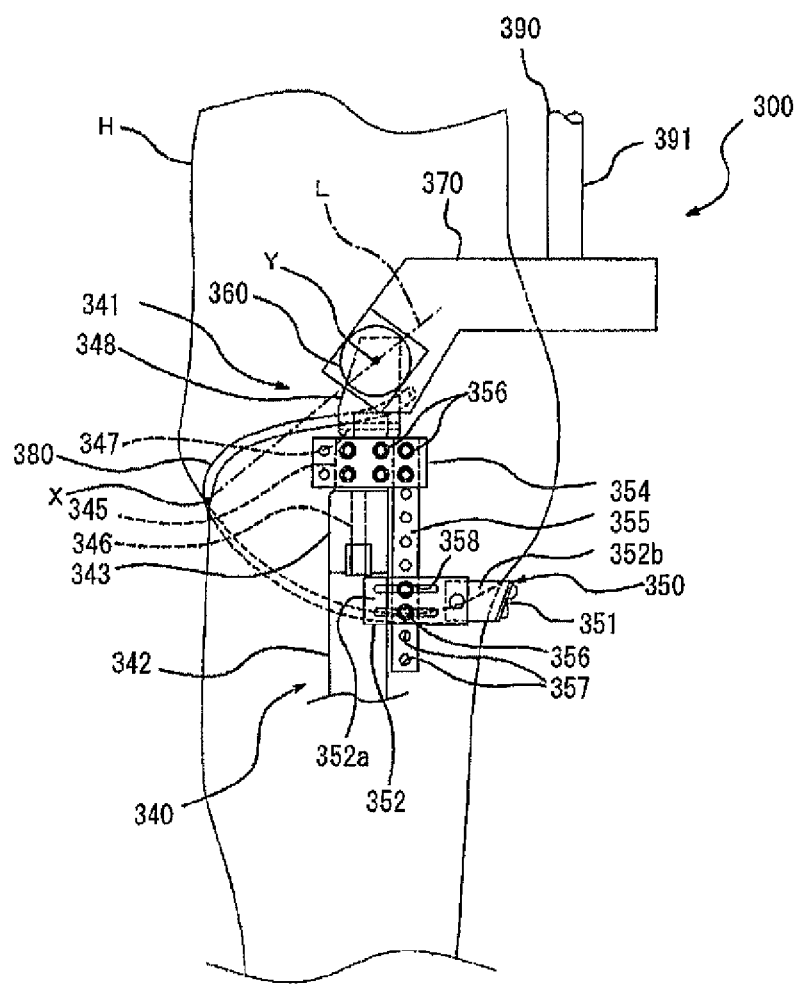
FIG. 28 is an enlarged left side view in the vicinity of a waist portion of a wearable motion supporting device according to a modification of Different Embodiment 2, corresponding to FIG. 24.
Figure 29:
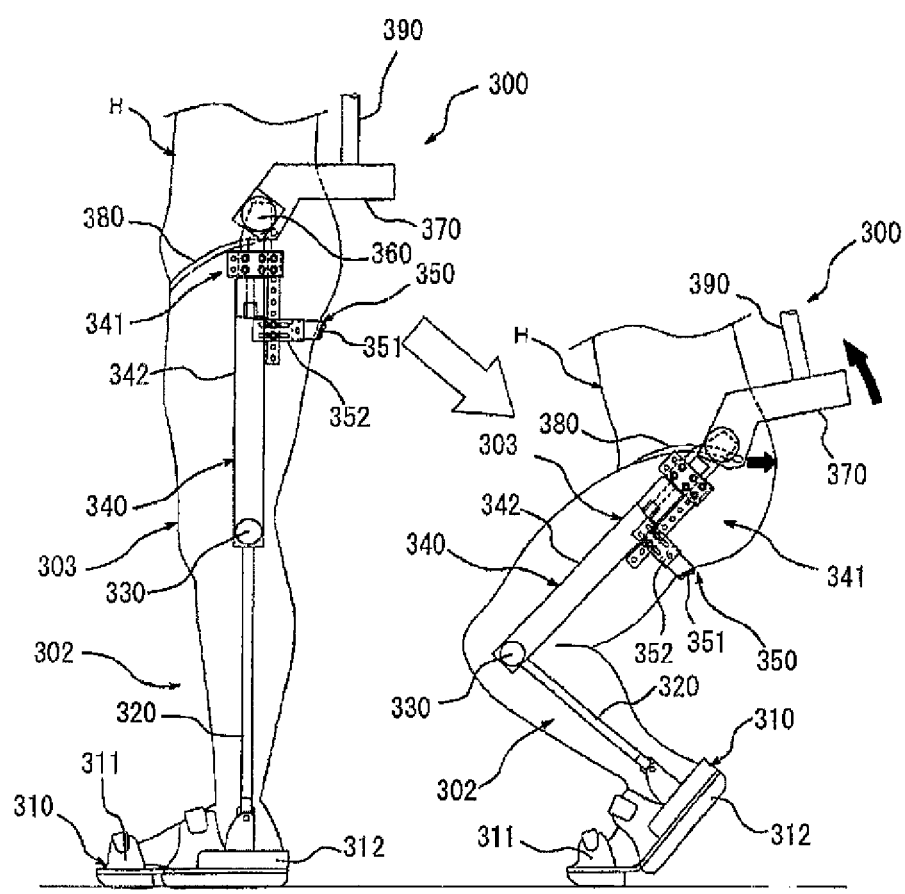
FIG. 29 is left side views of the wearable motion supporting device shown in FIG. 28, the right view showing a state where a user crouches down, and the left view showing a state where the user rises up.

As shown in FIGS. 28 and 29, as to an attachment position of the suspension member 380 to the pelvis frame 370, the suspension member 380 may be attached on an obliquely lower rear side when seen from the pelvis drive device 360. According to the above-described configuration, when the user crouches down, and the pelvis frame 370 turns with respect to the thigh frame 340 (turns in the counterclockwise direction in the right view of FIG. 29), the attachment position of the suspension member 380 moves rearward, and thus, the suspension member 380 is pulled rearward. Thereby, the suspension member 380 operates so as to lift the buttock supporting member 350, which can reduce the buttock gap. Here, the suspension member 380 is attached to an inner surface of the pelvis frame 370. This makes it difficult for the suspension member 380 to interfere with the other configurations, thereby enabling the suspension member 380 to stably lift the buttock supporting member 350.

When the configuration is such that the attachment position of the suspension member 380 in the pelvis frame 370 is within a predetermined region described below, and moves within the region, the above-described operation can be exerted. The "predetermined region" here is a region located below a virtual line L when seen from the side surface side, the virtual line L being obtained by connecting a point X (hereinafter, referred to as a "contact point") closest to the pelvis frame 370 of portions of the suspension member 380 in contact with a solid (here, the user H), and a turning axis of the pelvis frame Y. In FIG. 28, the contact point X is located in a front surface of the user H. For example, if the suspension member 380 is configured to pass a certain point of a certain member immediately before the pelvis frame 370, the "predetermined region" can be changed with the passed point as the contact point X.

Even when the above-described attachment position enters the above-described predetermined region or exits the predetermined region in the process of the crouching of the user H, the suspension member 380 may be lifted at some rotation angles of the pelvis frame 370. Moreover, in some cases, the contact point X itself may move in the process of the crouching of the user H. Consequently, as long as the suspension member 380 is configured to directly connect a vicinity of the inseam of the user H and the pelvis frame, for example, the following configuration may be employed. That is, in the state where the user H rises up, a line (corresponding to the above-described virtual line) passing the turning axis Y of the pelvis frame 370 and inclined rearward at 30 to 60 degrees to a vertical direction is assumed, and the suspension member 380 may be attached to the pelvis frame 370 on the lower side (on the rear side) from the line in side view. According to the above-described configuration, the above-described operation can be substantially exerted. Here, the attachment position of the suspension member 380 has been described by changing the view point, and in short, the suspension member 380 only needs to be attached at the position where the suspension member is pulled when the user H performs the crouching motion.

Different Embodiment 3

Furthermore, the foregoing wearable motion supporting device may be configured as follows. A wearable motion supporting device according to Different Embodiment 3 is a wearable motion supporting device that assists or substitutes for muscle strength of a wearer, including a thigh wearing portion that is worn on a thigh side portion of the wearer, a lower thigh wearing portion that is worn on a lower thigh side portion of the wearer, a knee joint portion connecting the thigh wearing portion and the lower thigh wearing portion, and a knee joint actuator that operates the knee joint portion so as to displace the lower thigh wearing portion relatively to the thigh wearing portion, wherein the knee joint actuator is disposed on a front side or on a rear side from an anteroposterior center of the thigh wearing portion, and inside the thigh wearing portion in the right-left direction so that a longitudinal direction of the knee joint actuator and a longitudinal direction of the thigh wearing portion are substantially parallel to each other. Hereinafter, a specific description will be given.

[Hip Joint Actuator]

Figure 30:
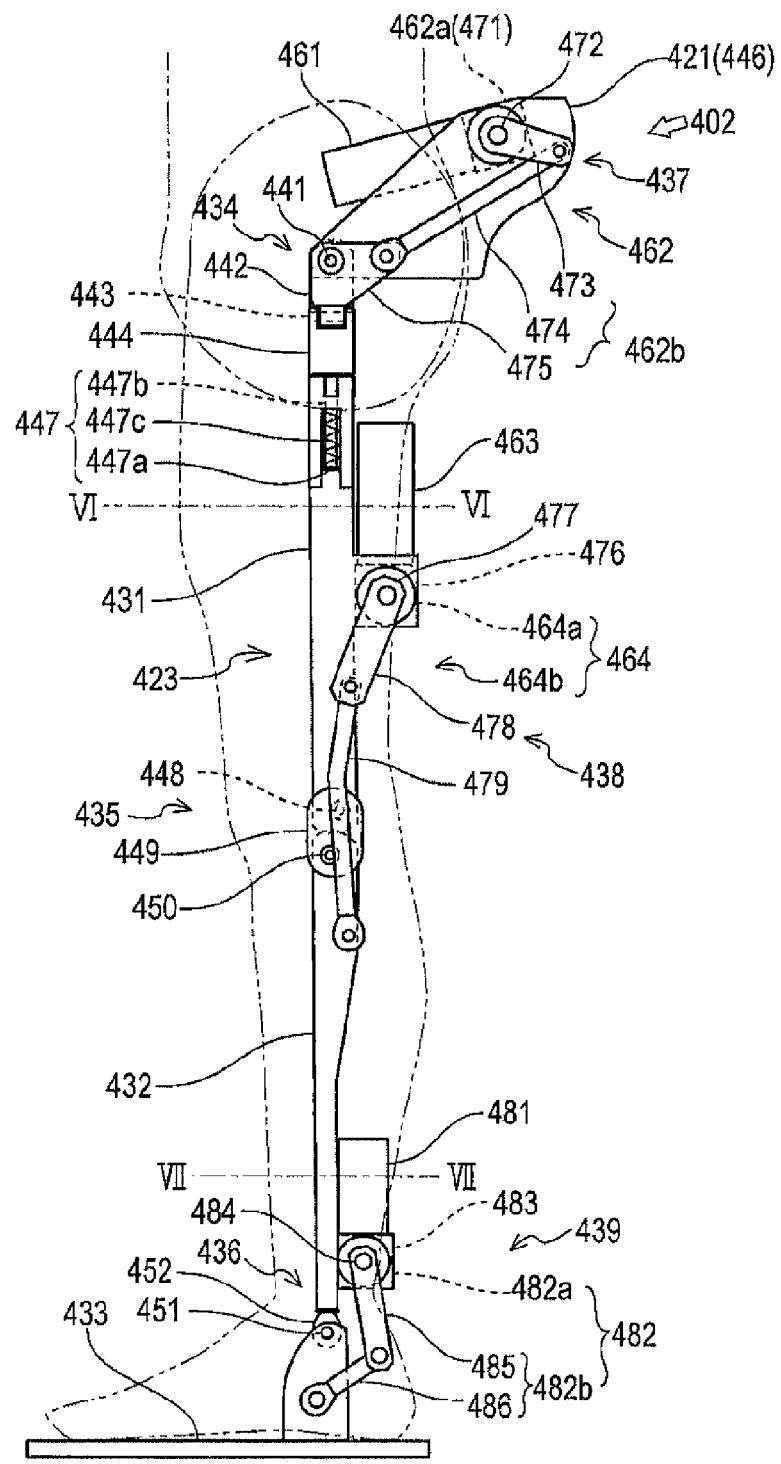
FIG. 30 is a side view showing a left lower portion of a wearable motion supporting device according to Different Embodiment 3.
Figure 31:
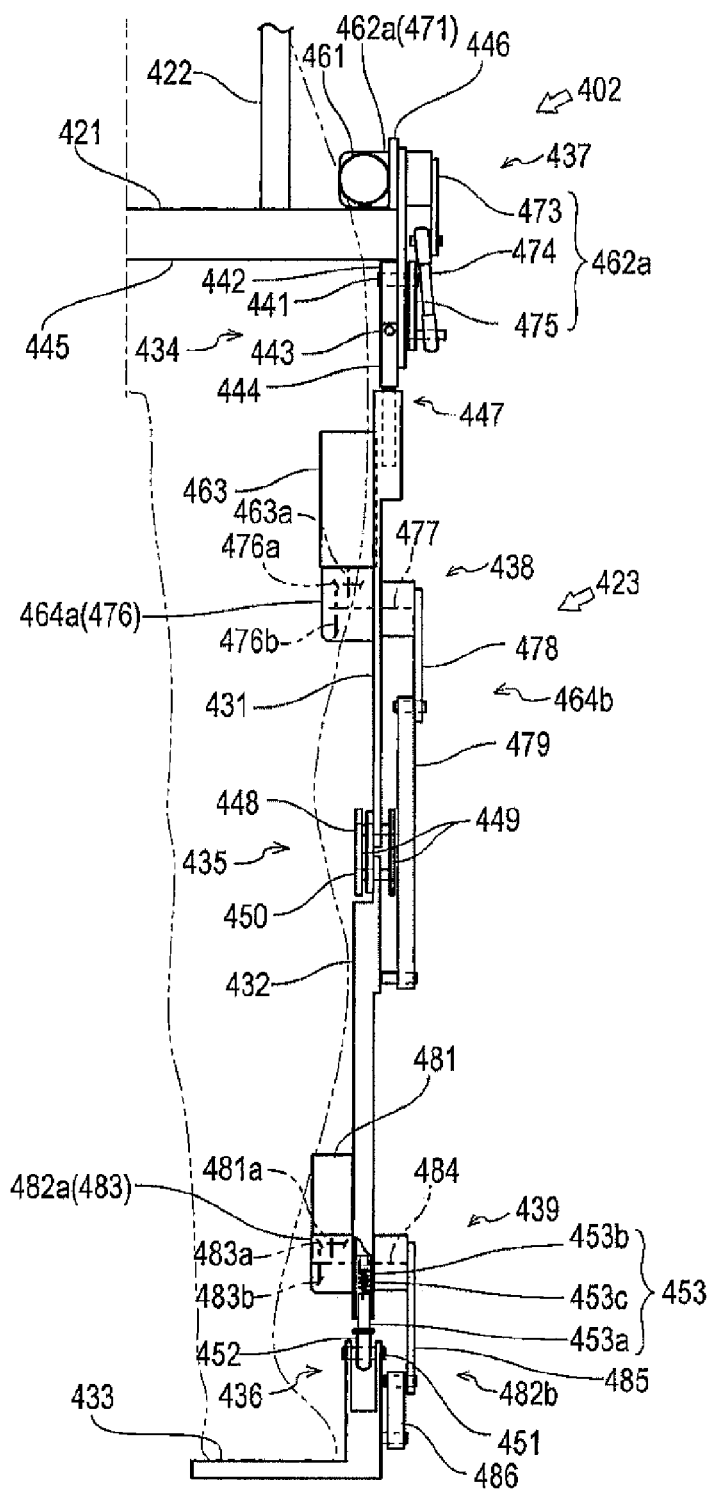
FIG. 31 is a front view showing a left lower portion of the wearable motion supporting device according to Different Embodiment 3.
Figure 32:
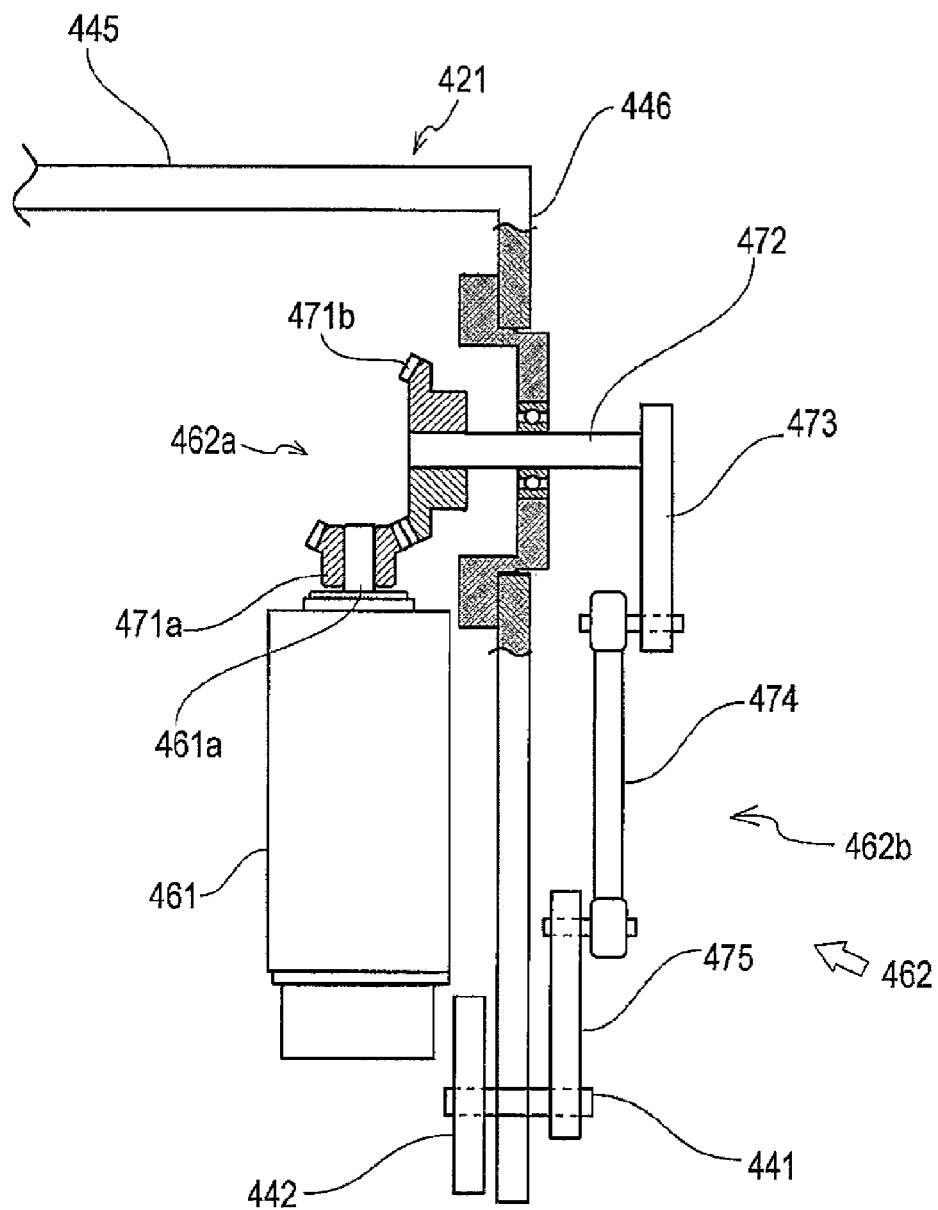
FIG. 32 is a plane/partially cross-sectional view showing a configuration of a hip joint power transmission mechanism.
Figure 33:
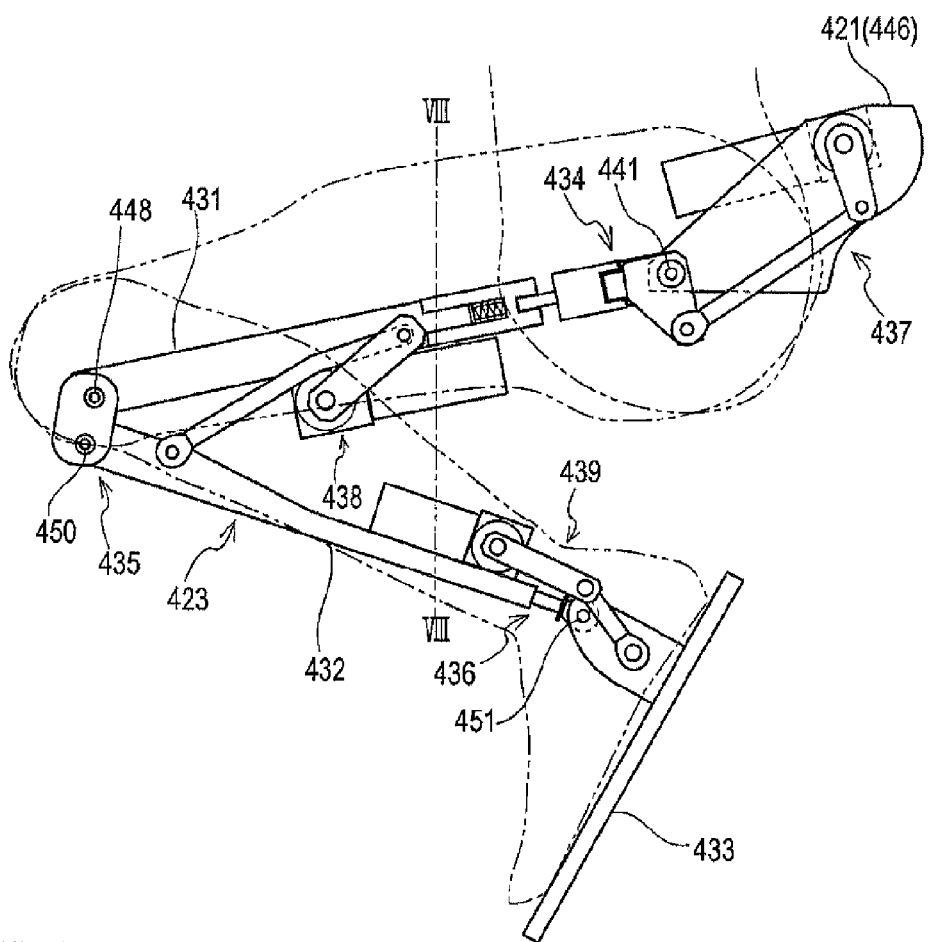
FIG. 33 is a side view showing the left lower portion of the wearable motion supporting device in a state where a hip joint portion and a knee joint portion are turned and displaced.

Referring to FIGS. 30 to 32, a hip joint actuator 461 will be described. The hip joint actuator 461 is an electric motor in the present different embodiment, and a longitudinal direction of the motor and an axial direction of an output shaft of the motor are parallel. The hip joint actuator 461 is supported by a waist frame 421, and is disposed on a right-left center side from a right-left end of the waist frame 421 so that a longitudinal direction of the hip joint actuator 461 is substantially parallel to the anteroposterior direction. In an example shown in FIG. 30, the hip joint actuator 461 is attached to the waist frame 421 in a posture where the longitudinal direction thereof is substantially parallel to the anteroposterior direction and descends forward. The hip joint actuator 461 arranged in this manner is located immediately above the pelvis and a thigh muscle outside the waist of the wearer of a wearing fixture 402 in the right-left direction and in a hollow on a body side of the wearer.

FIG. 32 is a plane/partially cross-sectional view showing a configuration of a hip joint power transmission mechanism. As shown in FIG. 32 in detail, a hip joint power transmission mechanism 462 is made up of a rotary-shaft orthogonally-crossing device 462*a* and a link mechanism 462*b*. The rotary-shaft orthogonally-crossing device 462*a* according to the present different embodiment is made up of a pair of engaged bevel gears 471*a*, 471*b*, and the one bevel gear 471*a* is fitted on an output shaft 461*a* of the hip joint actuator 461, and the other bevel gear 471*b* is fitted on a drive shaft 472 substantially orthogonal to the output shaft 461*a*. An output link 473 is fixed to the drive shaft 472. The output link 473 is connected to an input link 475 through an intermediate link 474. The input link 475 is supported by a hip joint shaft 41 to turn integrally with a first coupling 442. These output link 473, intermediate link 474, and input link 475, and a side portion 446 of the waist frame 421 make up the link mechanism 462*b* (the four-node link mechanism).

[Knee Joint Actuator]

Figure 34:
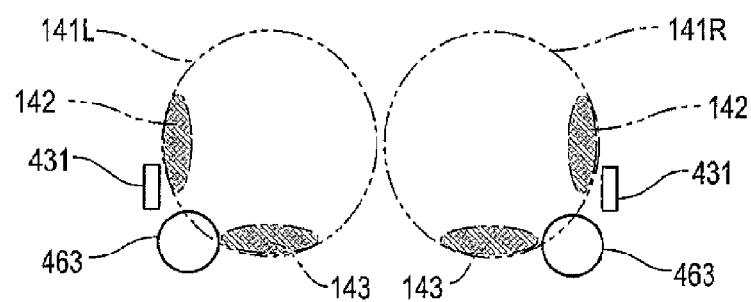
FIG. 34 is a cross-sectional view along VI-VI in FIG. 30.

Referring to FIGS. 30, 31, and 34, the knee joint actuator 463 will be described. The hip joint actuator 463 is an electric motor in the present different embodiment, and this electric motor is long in an axial direction of an output shaft of the motor. The knee joint actuator 463 is supported by a thigh rod 431. In this manner, the knee joint actuator 463 is arranged on the waist side apart from a knee joint of the wearer, by which inertia (moment of inertia) applied to the wearer, attributed to a weight of the knee joint actuator 463 during walking of the wearer can be reduced, as compared with a configuration where the knee joint actuator 463 is arranged in the vicinity of the knee joint of the wearer.

The knee joint actuator 463 is disposed on the rear side from an anteroposterior center of the thigh rod 431, and inside an outermost portion of the thigh rod 431 in the right-left direction so that a longitudinal direction of the knee joint actuator 463 and a longitudinal direction of the thigh rod 431 are substantially parallel to each other. The longitudinal direction of the thigh rod 431 is a direction connecting a hip joint portion 434 and a knee joint portion 435, and is substantially parallel to a direction where a femur of the wearer extends. As shown in FIG. 34, the knee joint actuator 463 arranged in this manner is located between biceps femoris muscle 143 and quadriceps femoris muscle 142 on the rear side from an anteroposterior center of a thigh 141L (R) of the wearer, and outside a right-left center of the thigh 141L (141R) of the wearer. An outer shape of a cross-section of the thigh of the wearer is elliptical, and a rear and outer portion in the right-left direction of this ellipse is a non-interference area in various motions of the body (e.g., a walking motion, a motion of raising and lowering a load, a sitting motion, and a crouching motion). In other words, the knee joint actuator 463 does not make contact with an object moving relatively to the knee joint actuator 463 (e.g., a load, a chair, an arm of the wearer) in the various motions of the wearer. While the knee joint actuator 463 may come into contact with the thigh of the wearer, and may also come into contact with the lower thigh of the wearer in some motions, the knee joint actuator 463 is arranged, avoiding striae of the lower thigh and the thigh of the wearer, which reduces uncomfortable feeling of the wearer.

[Foot Joint Actuator]

Referring to FIGS. 30 to 31, a foot joint actuator 481 will be described. The foot joint actuator 481 is an electric motor in the present different embodiment, and this electric motor is long in an axial direction of an output shaft of the motor. The foot joint actuator 481 is supported by a lower thigh rod 432. In this manner, the foot joint actuator 481 is arranged on the knee side apart from a foot joint of the wearer, which can reduce a moment of inertia applied to the wearer, attributed to a weight of the foot joint actuator 481 during walking of the wearer, as compared with a configuration where the foot joint actuator 481 is arranged in the vicinity of the foot joint of the wearer.

Figure 35:
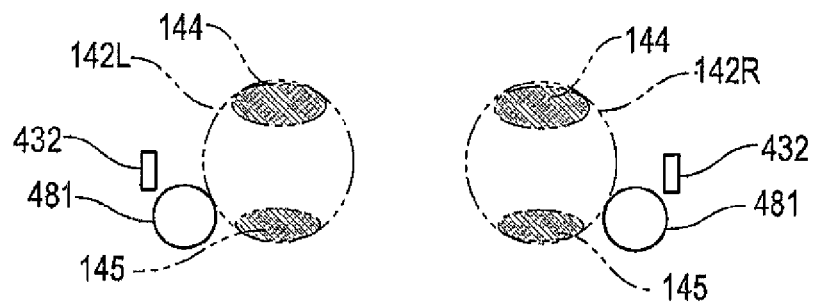
FIG. 35 is a cross-sectional view along VII-VII in FIG. 30.

Moreover, the foot joint actuator 481 is disposed on the rear side from an anteroposterior center of the lower thigh rod 432, and inside an outermost portion of the lower thigh rod 432 in the right-left direction so that a longitudinal direction of the foot joint actuator 481 and a longitudinal direction of the lower thigh rod 432 are substantially parallel to each other. The longitudinal direction of the lower thigh rod 432 is a direction connecting the knee joint portion 435 and a foot joint portion 436, and is substantially parallel to a direction where a lower leg bone (neck bone) of the wearer extends. As shown in FIG. 35, the foot joint actuator 481 arranged in this manner is located between tibialis anterior muscle (or extensor digitorum longus muscle) 144 and triceps surae muscle 145 on the rear side from an anteroposterior center of a lower thigh 142L (142R) of the wearer of the wearing fixture 402, and outside a right-left center of the lower thigh 142L (142R) of the wearer. An outer shape of a cross-section of a lower portion than a calf in the lower thigh of the wearer is elliptical, and a rear and outer portion in the right-left direction of this ellipse is a non-interference area in the various motions of the body (e.g., the walking motion, the motion of raising and lowering a load, the sitting motion, and the crouching motion). In other words, the foot joint actuator 481 does not make contact with an object moving relatively to the foot joint actuator 481 (e.g., a load, a chair, an arm of the wearer) in the various motions of the wearer. While the foot joint actuator 481 may come into contact with the lower thigh of the wearer, and may also come into contact with the thigh of the wearer in some motions, the foot joint actuator 481 is arranged, avoiding the striae of the lower thigh and the thigh of the wearer, which reduces uncomfortable feeling of the wearer.

[Operation of the Present Different Embodiment and the Like]

In the motion supporting device 401 according to the present different invention, all the actuators 461, 463, 481 are arranged inside an outer framework of the device formed of the waist frame 421 and a back portion frame 422 in the right-left direction. Thus, a projection amount of the whole device in the right-left direction of the wearer by the actuators 461, 463, 481 to drive the joints can be reduced.

Figure 36:
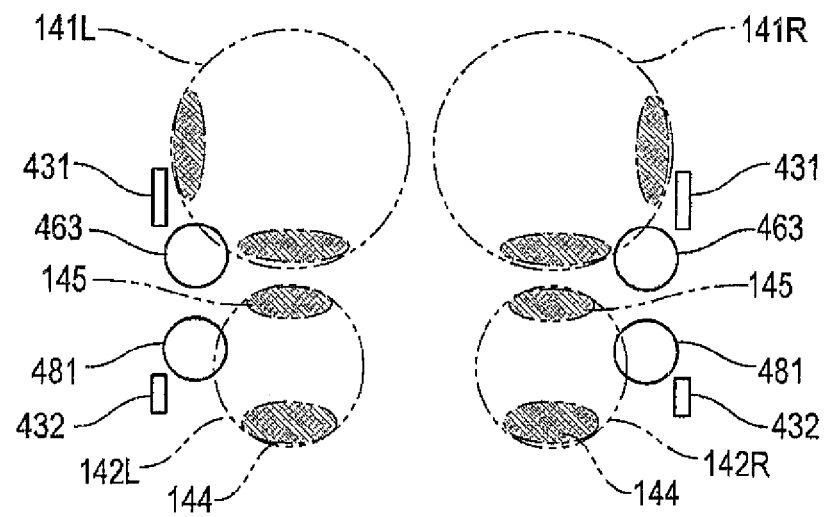
FIG. 36 is a cross-sectional view along VIII-VIII in FIG. 33.
Figure 37:
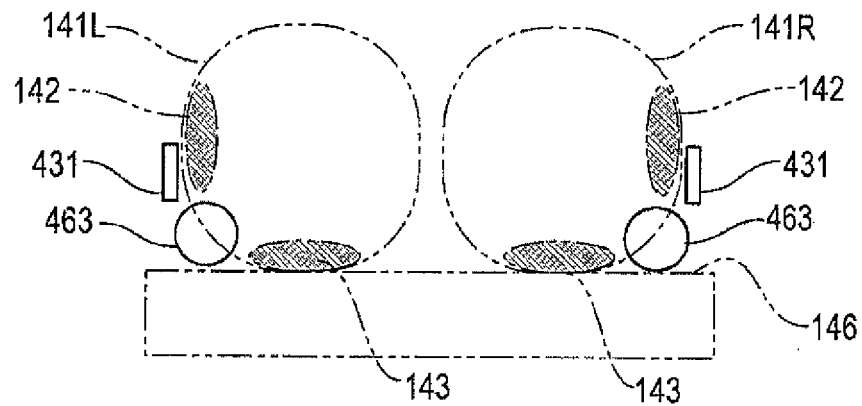
FIG. 37 is a view for describing relationships between a thigh of the wearer, and a thigh rod and a knee joint actuator when the wearer is seated.

Moreover, in the motion supporting device 401, the actuators 461, 463, 481 to drive the joints are disposed so as not to encumber the walking motion, the motion of raising and lifting a load, the sitting motion and the crouching motion. For example, while during the crouching motion in which the hip joint and the knee joint of the wearer are bent, as shown in FIG. 5, the knee joint actuator 463 and the foot joint actuator 481 are located in the middle of the thigh 141L (141R) and in the middle of the lower thigh 142L (142R) of the wearer, respectively, as shown in FIG. 36, these motions are not disturbed. While the knee joint actuator 463 and the foot joint actuator 481 make contact with the thigh 141L (141R) and the lower thigh 142L (142R) of the wearer, respectively, they are in contact with the hollows of the body such as portions between the striae, where the striae is avoided, so that uncomfortable feeling of the wearer can be reduced. In addition, when the actuators 461, 463, 481 each have a chamfered shape, the uncomfortable feeling by the contact between these actuators and the wearer can be further reduced. Moreover, for example, as shown in FIG. 37, during the sitting motion of the wearer, the knee joint actuators 463 are in non-contact with a seat surface 146 of a chair in a state where the seat surface 146 and the lower thighs 142L, 142R of the wearer are in contact. Here, while the knee joint actuator 463 and the thigh 141L (141R) of the wearer are in contact with each other, the knee joint actuator 463 makes contact in the hollow of the body between the quadriceps femoris muscle 142 and biceps femoris muscle 143 of the wearer, where the striae is avoided, and subcutaneous fat existing in the contact site of the wearer with the knee joint actuator 463 is deformed, which can reduce uncomfortable feeling of the wearer.

In the motion supporting device 401 according to the present different embodiment, while the knee joint actuator 463 is arranged on the rear side from the anteroposterior center of the thigh rod 431, it may be arranged on the front side from the anteroposterior center of the thigh rod 431. In this case as well, since the knee joint actuator 463 is arranged inside the thigh rod 431 in the right-left direction so that the longitudinal direction of the knee joint actuator 463 and the longitudinal direction of the thigh rod 431 are substantially parallel to each other, the knee joint actuator 463 does not largely project outward in the right-left direction from a lower extremity frame 423 of the wearing fixture 402, and does not interfere in the various motions of the wearer.

Moreover, for example, in the motion supporting device 401 of the present different embodiment, while the foot joint actuator 481 is arranged on the rear side from the anteroposterior center of the lower thigh rod 432, it may be arranged on the front side from the anteroposterior center of the lower thigh rod 432. In this case as well, since the foot joint actuator 481 is arranged inside the lower thigh rod 432 in the right-left direction so that the longitudinal direction of the foot joint actuator 481 and the longitudinal direction of the lower thigh rod 432 are substantially parallel to each other, the foot joint actuator 481 does not largely project outward in the right-left direction from the lower extremity frame 423 of the wearing fixture 402, and does not interfere in the various motions of the wearer. While in the present different embodiment, the case where the hip joint actuator 461, the knee joint actuator 463, and the foot joint actuator 841 are the electric motors has been described, these may be each made of an air cylinder, a hydraulic cylinder or the like.

INDUSTRIAL APPLICABILITY

The present invention provides a wearable motion supporting device that is worn on lower extremities of a user to assist or substitute for motions of the lower extremities of the user, such as walking, running, rising, sitting, and ascent/descent of a step accompanying bending and stretching of hip joints and knee joints, the device including a back portion frame (backpack) tied on a shoulder or a side of the wearer, and is useful for preventing shaking of the back portion frame.

DESCRIPTION OF REFERENCE SIGNS 10 wearable motion supporting device
11 wearing fixture
12 backpack
13 battery
14 controller
30 waist portion frame
31 base portion
32 side portion
40 back portion frame
50 lower extremity frame
51 thigh arm
52 lower thigh arm
53 foot arm
53a sole frame
61 actuator for hip joint
62 joint for hip joint
63 actuator for knee joint
64 joint for foot joint
70 connection portion
71 upper link
72 lower link
73 right link
74 left link

The invention claimed is:

1. A wearable motion supporting device that assists or substitutes for muscle strength of a wearer, comprising:
  a waist portion frame adapted to be worn around a waist of the wearer, the waist portion frame including:
    a base portion that is long in a right-left direction of the wearer,
    a right side portion extending forwardly from a right end of the base portion, and
    a left side portion extending forwardly from a left end of the base portion,
    wherein the base portion, the right side portion, and the left side portion behave entirely and integrally;
  a right lower extremity frame and a left lower extremity frame that are connected to a lower portion of the waist portion frame and adapted to be worn on lower extremities of the wearer;
  a back portion frame that is connected to an upper portion of the waist portion frame and has a locking fixture adapted to tie the back portion frame on a shoulder of the wearer; and
  a rotational mechanism of one DOF (Degree Of Freedom) on a frontal plane that connects the back portion frame and the base portion of the waist portion frame, wherein
  the right lower extremity frame is connected to a front end of the right side portion such that the right lower extremity frame is turnable, on a first sagittal plane with respect to the base portion of the waist portion frame, and
  the left lower extremity frame is connected to a front end of the left side portion such that the left lower extremity frame is turnable on a second sagittal plane with respect to the base portion of the waist portion frame.

2. The wearable motion supporting device according to claim 1, wherein
  the rotational mechanism is a four-node link mechanism made up of a lower link provided in the waist portion frame so as to be substantially parallel to the base portion, an upper link provided in the back portion frame, and a left link and a right link joined to the lower link and the upper link, respectively, the four-node link mechanism being line-symmetrical with a right-left center of the waist portion frame as a symmetrical axis.

3. The wearable motion supporting device according to claim 2, wherein
  in the four-node link mechanism, a shape formed by lines connecting four nodes in order is an upside down trapezoid.

4. The wearable motion supporting device according to claim 2, wherein
joining positions of the right link and the left link in at least one of the lower link and the upper link are variable in a right-left direction.

5. The wearable motion supporting device according to claim 1, wherein
the rotational mechanism is made up of a shaft perpendicular to the frontal plane, the shaft being inserted into joining holes provided at a substantial right-left center of the base portion of the waist portion frame and at a substantial right-left center of the back portion frame, respectively.

6. The wearable motion supporting device according to claim 1, wherein
the right lower extremity frame, the left lower extremity frame, and the waist portion frame have a total of four rotational DOFs on the frontal plane, and a total of four or more rotational DOFs on a sagittal plane.

7. The wearable motion supporting device according to claim 6, wherein
the right lower extremity frame and the left lower extremity frame each has a thigh arm adapted to be worn on a thigh of the wearer, a lower thigh arm adapted to be worn on a lower thigh of the wearer, and a foot arm adapted to be worn on a foot portion of the wearer,
the thigh arm and the lower thigh arm are connected turnably on the sagittal plane, and
the waist portion frame and the thigh arm, and the lower thigh arm and the foot arm are connected turnably on the sagittal plane and on the frontal plane.

8. The wearable motion supporting device according to claim 7, wherein
the lower extremity frames each have a restriction member that restricts a turning range of the lower thigh arm on the frontal plane with respect to the foot arm.

9. The wearable motion supporting device according to claim 1, wherein
the lower extremity frames each have a thigh arm adapted to be worn on a thigh of the wearer, a lower thigh arm adapted to be worn on a lower thigh of the wearer, and a translational DOF mechanism that enables the thigh arm to extend in a translational direction from a reference length of the thigh arm.

10. The wearable motion supporting device according to claim 9, wherein
the translational DOF mechanism has a convolution DOF in combination.

11. The wearable motion supporting device according to claim 1, wherein
the lower extremity frames each have a thigh arm adapted to be worn on a thigh of the wearer, a lower thigh arm adapted to be worn on a lower thigh of the wearer, and a translational DOF mechanism that enables the lower thigh arm to extend in a translational direction from a reference length of the lower thigh arm.

12. The wearable motion supporting device according to claim 1, wherein
the lower extremity frames each have a sole plate on which a foot of the wearer is placed.

13. The wearable motion supporting device according to claim 1, wherein:
a first actuator connects the right lower extremity frame to the front end of the right side portion, the first actuator being configured to turn the right lower extremity frame on the first sagittal plane with respect to the base portion of the waist portion frame; and
a second actuator connects the left lower extremity frame to the front end of the left side portion, the second actuator being configured to turn the left lower extremity frame on the second sagittal plane with respect to the base portion of the waist portion frame.

14. The wearable motion supporting device according to claim 13, wherein:
the right lower extremity frame is connected to the front end of the right side portion by a right hip joint, the first actuator being configured to turn a portion of the right hip joint on the first sagittal plane in order to turn the right lower extremity frame on the first sagittal plane, and
the left lower extremity frame is connected to the front end of the left side portion by a left hip joint, the second actuator being configured to turn a portion of the left hip joint on the second sagittal plane in order to turn the left lower extremity frame on the second sagittal plane.

15. The wearable motion supporting device according to claim 14, wherein
the portion of the right hip joint is a first coupling,
the right hip joint includes a second coupling connected to the first coupling so as to be turnable on a frontal plane,
the portion of the left hip joint is a third coupling, and
the left hip joint includes a fourth coupling connected to the third coupling so as to be turnable on a frontal plane.

* * * * *